US012490192B2

(12) United States Patent
Paz et al.

(10) Patent No.: US 12,490,192 B2
(45) Date of Patent: Dec. 2, 2025

(54) NARROWBAND COMPONENT CARRIER FOR LOW POWER USER EQUIPMENT

(71) Applicant: QUALCOMM Incorporated, San Diego, CA (US)

(72) Inventors: Daniel Paz, Geva Carmel (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 581 days.

(21) Appl. No.: 17/746,788

(22) Filed: May 17, 2022

(65) Prior Publication Data
US 2023/0379826 A1 Nov. 23, 2023

(51) Int. Cl.
*H04W 52/02* (2009.01)
*H04L 5/00* (2006.01)

(52) U.S. Cl.
CPC ....... *H04W 52/0235* (2013.01); *H04L 5/0023* (2013.01); *H04L 5/0051* (2013.01); *H04W 52/0212* (2013.01)

(58) Field of Classification Search
CPC .......... H04W 52/0235; H04W 52/0212; H04L 5/0023; H04L 5/0051
USPC ......................................... 370/311
See application file for complete search history.

(56) References Cited

U.S. PATENT DOCUMENTS

| | | | |
|---|---|---|---|
| 2006/0133551 A1* | 6/2006 | Davidoff | H04B 1/001 375/350 |
| 2008/0240170 A1* | 10/2008 | Elmala | H01Q 3/2682 370/517 |
| 2012/0114021 A1* | 5/2012 | Chung | H04B 7/15557 375/211 |
| 2017/0223725 A1* | 8/2017 | Xiong | H04L 5/0053 |
| 2017/0339677 A1* | 11/2017 | Rico Alvarino | H04W 74/006 |
| 2019/0182823 A1* | 6/2019 | Awad | H04W 72/21 |

\* cited by examiner

*Primary Examiner* — Chi Tang P Cheng
(74) *Attorney, Agent, or Firm* — Holland & Hart LLP

(57) ABSTRACT

Methods, systems, and devices for wireless communications are described. A user equipment (UE) may transmit an indication of a capability for the UE to support narrowband control signaling over a narrowband component carrier that is separate from data channel signaling over one or more wideband component carriers. The UE may receive control signaling indicating a configuration for the narrowband component carrier based on the capability and monitor for the narrowband control signaling on the narrowband component carrier based on the configuration. The UE may perform signal processing on narrowband signaling using a dedicated narrowband receive chain, which may include lower power components than a receive chain for wideband signaling.

30 Claims, 16 Drawing Sheets

NARROWBAND COMPONENT CARRIER FOR LOW POWER USER EQUIPMENT

FIELD OF TECHNOLOGY

The following relates to wireless communications, including a narrowband component carrier for low power user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support a narrowband component carrier for low power user equipment (UE). Generally, the described techniques provide for supporting a narrowband component carrier configured for narrowband control signaling and one or more wideband component carriers for data signaling for a given UE. A first UE hardware path may be associated with the narrowband component carrier, and a second hardware path different from the first hardware path may be associated with the one or more wideband component carriers. In some examples, a UE may transmit an indication of a capability for the UE to support narrowband control signaling over a narrowband component carrier that is separate from data channel signaling over one or more wideband component carriers. For instance, a UE may indicate to a network entity that the UE is able to receive narrowband control signaling on a narrowband component carrier that is separate from one or more wideband component carriers which the UE may use to receive data channel signaling. Based on the capability, the UE may receive control signaling indicating a configuration for the narrowband component carrier. The UE may monitor for the narrowband control signaling on the narrowband component carrier based on the configuration. By monitoring for the narrowband control signaling on the narrowband component carrier and receiving the data channel signaling on the one or more wideband component carriers, the UE may set relaxed performance requirements for communications on the narrowband component carrier, contributing to reduced complexity and reduced power consumption for wireless communications performed by the UE.

A method for wireless communications at a UE is described. The method may include transmitting an indication of a capability for the UE to support narrowband control signaling over a narrowband component carrier that is separate from data channel signaling over one or more wideband component carriers, receiving control signaling indicating a configuration for the narrowband component carrier based on the capability, and monitoring for the narrowband control signaling on the narrowband component carrier based on the configuration.

An apparatus for wireless communications at a UE is described. The apparatus may include a processor, memory coupled with the processor, and instructions stored in the memory. The instructions may be executable by the processor to cause the apparatus to transmit an indication of a capability for the UE to support narrowband control signaling over a narrowband component carrier that is separate from data channel signaling over one or more wideband component carriers, receive control signaling indicating a configuration for the narrowband component carrier based on the capability, and monitor for the narrowband control signaling on the narrowband component carrier based on the configuration.

Another apparatus for wireless communications at a UE is described. The apparatus may include means for transmitting an indication of a capability for the UE to support narrowband control signaling over a narrowband component carrier that is separate from data channel signaling over one or more wideband component carriers, means for receiving control signaling indicating a configuration for the narrowband component carrier based on the capability, and means for monitoring for the narrowband control signaling on the narrowband component carrier based on the configuration.

A non-transitory computer-readable medium storing code for wireless communications at a UE is described. The code may include instructions executable by a processor to transmit an indication of a capability for the UE to support narrowband control signaling over a narrowband component carrier that is separate from data channel signaling over one or more wideband component carriers, receive control signaling indicating a configuration for the narrowband component carrier based on the capability, and monitor for the narrowband control signaling on the narrowband component carrier based on the configuration.

Some examples of the method, apparatuses, and non-transitory computer-readable medium described herein may further include operations, features, means, or instructions for receiving a downlink grant on the narrowband component carrier based on monitoring the narrowband component carrier, where the downlink grant allocates a downlink shared channel resource on a wideband component carrier of the one or more wideband component carriers and receiving a downlink shared channel transmission on the downlink shared channel resource based on the downlink grant.

Some examples of the method, apparatuses, and non-transitory computer-readable medium described herein may further include operations, features, means, or instructions for performing beam management to select a beam of a set of multiple available beams during a time gap between receiving the downlink grant on the narrowband component carrier and receiving the downlink shared channel transmission via the downlink shared channel resource of the wideband component carrier, where the downlink shared channel transmission may be received via the selected beam and where the configuration indicates a time duration associated with the time gap.

Some examples of the method, apparatuses, and non-transitory computer-readable medium described herein may further include operations, features, means, or instructions for triggering demodulation of the downlink shared channel transmission via the downlink shared channel resource of the wideband component carrier based on receiving the downlink grant on the narrowband component carrier.

In some examples of the method, apparatuses, and non-transitory computer-readable medium described herein, monitoring for the narrowband control signaling on the narrowband component carrier may include operations, features, means, or instructions for monitoring for the narrowband control signaling in a first search space set of the narrowband component carrier that includes more symbols than a second search space set of a wideband component carrier of the one or more wideband component carriers, where the configuration indicates the first search space set.

In some examples of the method, apparatuses, and non-transitory computer-readable medium described herein, monitoring for the narrowband control signaling may include operations, features, means, or instructions for receiving the narrowband control signaling on the narrowband component carrier and processing the narrowband control signaling using a narrowband receive chain that may be separate from a wideband receive chain associated with the one or more wideband component carriers.

In some examples of the method, apparatuses, and non-transitory computer-readable medium described herein, the wideband receive chain associated with the one or more wideband component carriers may be inactive while processing the narrowband control signaling using the narrowband receive chain.

In some examples of the method, apparatuses, and non-transitory computer-readable medium described herein, the narrowband receive chain includes an analog front-end, an analog-to-digital converter, a digital front-end, a demodulator, or any combination thereof, unique to the narrowband receive chain.

In some examples of the method, apparatuses, and non-transitory computer-readable medium described herein, monitoring for the narrowband control signaling may include operations, features, means, or instructions for receiving synchronization signal block signaling, initial access signaling, scheduling signaling, reference signal allocation signaling, on the narrowband component carrier.

In some examples of the method, apparatuses, and non-transitory computer-readable medium described herein, transmitting the indication of the capability may include operations, features, means, or instructions for transmitting an indication of a first error vector magnitude associated with the narrowband component carrier, where the first error vector magnitude associated with the narrowband component carrier may be higher than a second error vector magnitude associated with the one or more wideband component carriers.

Some examples of the method, apparatuses, and non-transitory computer-readable medium described herein may further include operations, features, means, or instructions for receiving a downlink grant on the narrowband component carrier based on monitoring for the narrowband control signaling, where the downlink grant allocates a downlink shared channel resource on the narrowband component carrier and receiving a downlink shared channel transmission on the downlink shared channel resource in accordance with a modulation and coding scheme associated with the narrowband component carrier based on the downlink grant.

In some examples of the method, apparatuses, and non-transitory computer-readable medium described herein, receiving the control signaling may include operations, features, means, or instructions for receiving the control signaling indicating the configuration that includes a frequency domain resource allocation (FDRA) field that identifies the narrowband component carrier, where the narrowband component carrier may be monitored based on the FDRA field.

A method for wireless communications at a network entity is described. The method may include receiving an indication of a capability for a UE to support narrowband control signaling over a narrowband component carrier that is separate from data channel signaling over one or more wideband component carriers, transmitting control signaling indicating a configuration for the narrowband component carrier based on the capability, and transmitting the narrowband control signaling on the narrowband component carrier based on the configuration.

An apparatus for wireless communications at a network entity is described. The apparatus may include a processor, memory coupled with the processor, and instructions stored in the memory. The instructions may be executable by the processor to cause the apparatus to receive an indication of a capability for a UE to support narrowband control signaling over a narrowband component carrier that is separate from data channel signaling over one or more wideband component carriers, transmit control signaling indicating a configuration for the narrowband component carrier based on the capability, and transmit the narrowband control signaling on the narrowband component carrier based on the configuration.

Another apparatus for wireless communications at a network entity is described. The apparatus may include means for receiving an indication of a capability for a UE to support narrowband control signaling over a narrowband component carrier that is separate from data channel signaling over one or more wideband component carriers, means for transmitting control signaling indicating a configuration for the narrowband component carrier based on the capability, and means for transmitting the narrowband control signaling on the narrowband component carrier based on the configuration.

A non-transitory computer-readable medium storing code for wireless communications at a network entity is described. The code may include instructions executable by a processor to receive an indication of a capability for a UE to support narrowband control signaling over a narrowband component carrier that is separate from data channel signaling over one or more wideband component carriers, transmit control signaling indicating a configuration for the narrowband component carrier based on the capability, and transmit the narrowband control signaling on the narrowband component carrier based on the configuration.

In some examples of the method, apparatuses, and non-transitory computer-readable medium described herein, transmitting the narrowband control signaling may include operations, features, means, or instructions for transmitting a downlink grant on the narrowband component carrier, where the downlink grant allocates a downlink shared channel resource on a wideband component carrier of the one or more wideband component carriers and transmitting a downlink shared channel transmission on the downlink shared channel resource based on the downlink grant.

In some examples of the method, apparatuses, and non-transitory computer-readable medium described herein, transmitting the narrowband control signaling may include operations, features, means, or instructions for transmitting the narrowband control signaling in a first search space set of the narrowband component carrier that includes more symbols than a second search space set of a wideband component carrier of the one or more wideband component carriers, where the configuration indicates the first search space set.

In some examples of the method, apparatuses, and non-transitory computer-readable medium described herein, transmitting the narrowband control signaling may include operations, features, means, or instructions for transmitting synchronization signal block signaling, initial access signaling, scheduling signaling, reference signal allocation signaling, on the narrowband component carrier.

In some examples of the method, apparatuses, and non-transitory computer-readable medium described herein, receiving the indication of the capability may include operations, features, means, or instructions for receiving an indication of a first error vector magnitude associated with the narrowband component carrier, where the first error vector magnitude associated with the narrowband component carrier may be higher than a second error vector magnitude associated with the one or more wideband component carriers.

In some examples of the method, apparatuses, and non-transitory computer-readable medium described herein, transmitting the narrowband control signaling may include operations, features, means, or instructions for transmitting a downlink grant on the narrowband component carrier, where the downlink grant allocates a downlink shared channel resource on the narrowband component carrier and transmitting a downlink shared channel transmission on the downlink shared channel resource in accordance with a modulation and coding scheme associated with the narrowband component carrier based on the downlink grant.

In some examples of the method, apparatuses, and non-transitory computer-readable medium described herein, transmitting the control signaling may include operations, features, means, or instructions for transmitting the control signaling indicating the configuration that includes a FDRA field that identifies the narrowband component carrier, where the narrowband component carrier may be monitored based on the FDRA field.

DETAILED DESCRIPTION

Figure 1:
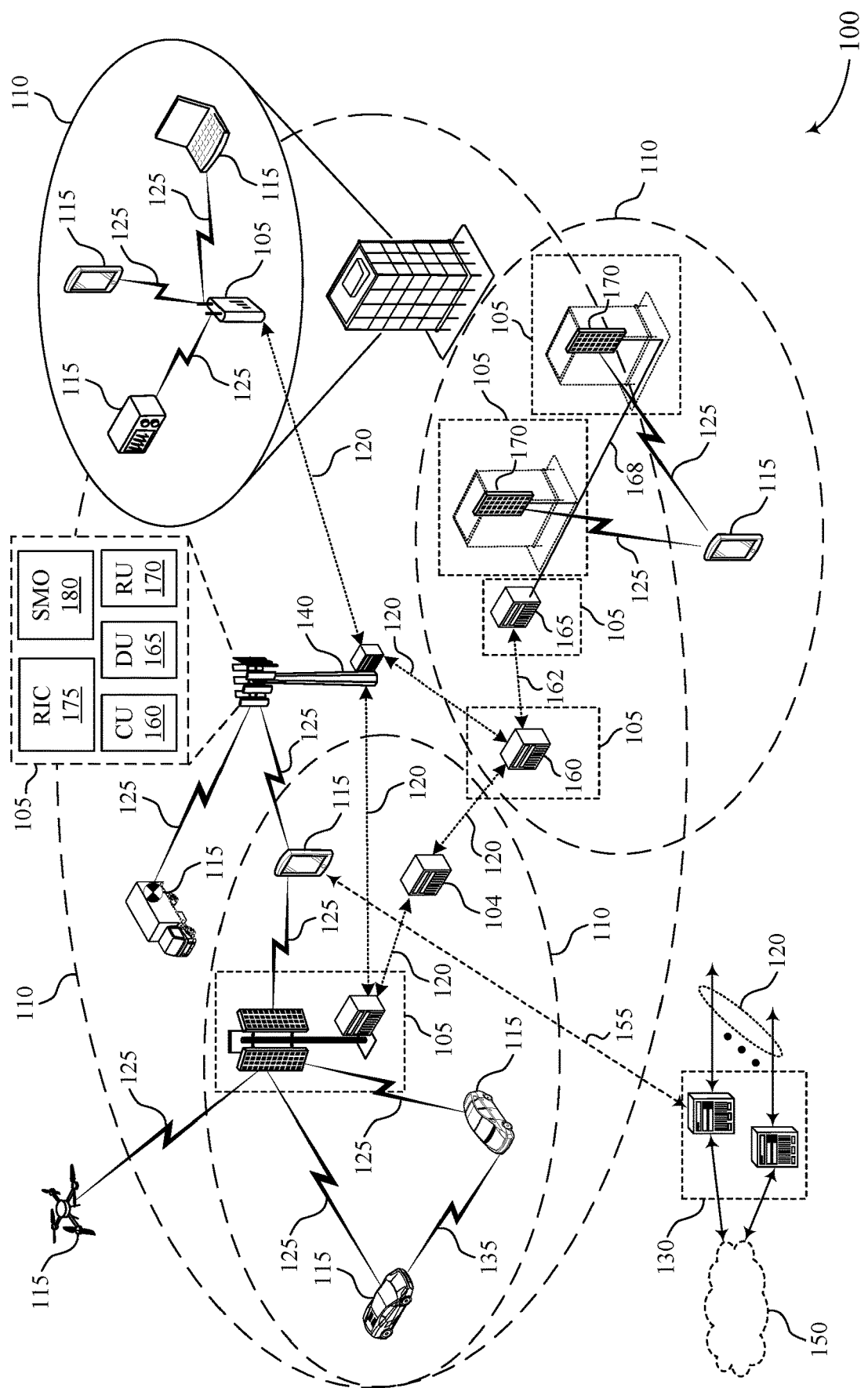
FIG. 1 illustrates an example of a wireless communications system that supports a narrowband component carrier for low power user equipment in accordance with one or more aspects of the present disclosure.

Some wireless communications systems may improve the quality of wireless communications by supporting communication devices (e.g., a user equipment (UE)) that operate at higher frequencies (e.g., a sub-terahertz (subThz) band). Communication devices operating at higher frequencies may have higher power consumption compared to communication devices operating at lower frequencies based on the higher frequencies having larger signal bandwidth and correspondingly higher data rates. For example, a UE operating in a subThz band may support a signal bandwidth that is larger than a signal bandwidth supported by a UE operating in a millimeter wave (mmW) system. In some cases, increasing the bandwidth size may also increase power usage, such that a high frequency band (e.g., the subThz band) is unfeasible for some UEs due to excessive power consumption. In some examples, digital components of a UE may dominate power consumption at the UE. For instance, digital demodulation and channel decoding related blocks of a receiving UE may consume more power than other components at the receiving UE. In some systems, radiofrequency (RF) processing at the UE may be a significant portion of power consumption at the UE. A UE operating at higher frequencies (e.g., the subThz band) may experience reduced efficiency of some RF processing components, such as low noise amplifiers (LNAs) and power amplifiers (PAs), which may further contribute to increased power consumption at the UE when operating in higher frequencies.

Techniques, systems, and devices are described herein to support a narrowband component carrier for UEs in a wireless communications system, such as low power UEs or reduced capability UEs. In some examples, a UE may require a higher bandwidth allocation or a higher error vector magnitude (EVM) requirement for data channel signaling than what is required for control signaling. Accordingly, the UE may utilize different component carriers to communicate different types of signals. In some examples, a UE may transmit an indication of a capability for the UE to support narrowband control signaling over a narrowband component carrier that is separate from data channel signaling over one or more wideband component carriers. The UE may receive control signaling indicating a configuration for the narrowband component carrier based on the capability. In some aspects, the UE may monitor for the narrowband control signaling on the narrowband component carrier based on the configuration.

In some examples, a UE may use separate receive chains to process narrowband signaling and wideband signaling. For example, the UE may use a narrowband receive chain with lower power components to process narrowband signaling in addition to a wideband receive chain which is used to process wideband signaling (e.g., or non-narrowband signaling). The narrowband receive chain may include lower cost or lower power components, which may reduce power consumption to process narrowband signaling. For example, the narrowband receive chain may include a low power demodulation component based on the lower EVM requirements for the narrowband component carrier. Similarly, the narrowband receive chain may include a lower resolution or lower-rate analog-to-digital converter (ADC), among other lower power components. Utilizing the narrowband receive chain may reduce power consumption for narrowband signaling and significantly decrease overall UE power consumption.

Aspects of the disclosure are initially described in the context of wireless communications systems. Aspects of the disclosure are then described in the context of separate receive chains and a process flow. Aspects of the disclosure are further illustrated by and described with reference to apparatus diagrams, system diagrams, and flowcharts that relate to a narrowband component carrier for low power user equipment.

FIG. 1 illustrates an example of a wireless communications system 100 that supports a narrowband component carrier for low power user equipment in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support a narrowband component carrier for low power user equipment as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples, a UE 115 may support bandwidth adaptation procedures per component carrier to allow for implementation of a power efficient operation for different scenarios. For instance, the UE 115 may implement a power efficient operation by performing a bandwidth adaptation procedure during time periods in which a signal bandwidth for the UE 115 may be dynamically adjusted based on actual data traffic demands for the UE 115 specifically. In some examples, the receive and transmit bandwidth of a UE 115 may be dynamically adjusted during a bandwidth adaptation procedure. For example, the bandwidth size or bandwidth location of the UE 115 may be ordered to change. In some aspects, the UE 115 may shrink the bandwidth during periods of low activity to save power. Additionally or alternatively, the UE may change the bandwidth location to increase scheduling flexibility.

A subset of the total cell bandwidth of a cell may be referred to as a bandwidth part (BWP). In some examples, a bandwidth adaptation procedure may be achieved by configuring the UE 115 with one or more BWPs and indicating to the UE 115 which of the configured BWPs is currently active. For instance, a UE 115 may be configured with up to four BWPs in a downlink or uplink channel, and a single downlink or uplink BWP may be active at a given time. Outside of an active downlink BWP, a UE 115 may not be expected to receive a physical downlink shared channel (PDSCH), physical downlink control channel (PDCCH), or channel state information (CSI) reference signal (CSI-RS). In some examples, a UE 115 may perform bandwidth adaptation procedures (e.g., BWP dynamic selection and/or activation) based on downlink control information (DCI) signaling. For instance, a UE 115 may receive DCI signaling and adopt a reception or transmission processing bandwidth for a data traffic volume or allocation bandwidth based on the DCI signaling.

In some examples, a UE 115 may use one or more of three BWP types in a wireless communications system 100. For instance, UE 115 may use an initial BWP common amongst all UEs 115 in the wireless communications system 100, a first UE-specific BWP (e.g., an active BWP), or a second UE-specific BWP (e.g., a default BWP). A UE 115 may use an initial BWP for an initial access process, and the size of the initial BWP may range between 24 RB and 96 RB in accordance with various settings. In some aspects, a UE 115 may use the initial BWP for operating in an idle mode. The initial BWP size may be smaller than the BWP size which the UE 115 may use when operating in a connected mode. After receiving a configuration or reconfiguration (e.g., a radio resource control (RRC) configuration), a UE 115 may start a data transfer by using an active BWP. In some examples, a UE 115 may use a default BWP upon the expiration of a BWP timer if a timer-based implicit fallback mechanism is employed by the UE 115.

Some wireless communications systems 100 may support a UE 115 operating at a higher frequency band to provide a larger signal bandwidth for the deployment of wireless communications with higher data and/or bit rates. For instance, UE 115 may operate in a subThz band instead of a mmW band to provide increased signal bandwidth (e.g., increased in order of several GHz). In some examples, a UE 115 in a mmW system may utilize carrier aggregation by supporting up to 8 continuous component carriers for downlink communication. The 8 continuous component carriers may be semi-statically preconfigured in advance such that each component carrier supports a bandwidth of 100 Mhz. Accordingly, the UE 115 in the mmW system may support a bandwidth of 800 Mhz. In other examples, a UE 115 in a subThz band may utilize carrier aggregation by supporting up to 12 continuous component carriers for downlink communication. The 12 continuous component carriers may be semi-statically preconfigured in advance such that each component carrier supports a bandwidth of 800 Mhz. Accordingly, the UE 115 in the subThz band may support a bandwidth of 9,600 Mhz, which is 12 times greater than the bandwidth supported by the UE 115 in the mmW system.

In some cases, a UE 115 may not be feasible for operation in a wireless communications system 100 due to the high amount of power consumption which may result from supporting a high signal bandwidth and operating at a high frequency. For example, a UE 115 in a subThz band may consume approximately 9 W of power to provide a bandwidth that is 12 times greater than the bandwidth provided by the UE 115 in the mmW system, which may consume approximately 3 W of power. Even though the UE 115 in the subThz band may provide 12 times greater bandwidth than the UE 115 in the mmW system, 9 W of power consumption may not be a practical amount of power consumption for a UE 115 in a wireless communications system 100.

In some examples, digital components of a UE 115 may be the most power-hungry components of the UE 115. For example, digital demodulation and channel decoding related blocks of a receiving UE 115 may consume the greatest portion of overall power at a receiving UE 115. Additionally or alternatively, digital front-end (DFE) (e.g., WMSS), ADCs, and fast Fourier transform (FFT) components of the receiving UE 115 may take a significant portion of the overall power consumption of the receiving UE 115. In some examples, RF processing may take a significant portion of the overall power consumption of the receiving UE 115. Additionally, a UE 115 may have a reduced LNA and PA efficiency when operating at high frequencies (e.g., due do non-linear behaviors of these components), which may contribute to further increased power consumption for a UE 115 operating at high frequencies.

Techniques for supporting wireless communications at a UE 115 (e.g., a UE 115 in a sub-Thz band) may be improved to allow for reduced power consumption by the UE 115. For example, although a UE 115 may allow for power efficient operation by utilizing bandwidth adaptation procedures under various scenarios, the bandwidth adaptation procedures may not be flexible enough to follow every scenario under which the UE 115 may benefit from the bandwidth adaptation procedures. For instance, a UE 115 may be unable to employ bandwidth adaption procedures in scenarios involving different BWP allocation sizes on different slots, control signaling with or without another BWP allocation on the same slot, different reference signals, and other scenarios of the like.

In some examples, a UE 115 may use a single component carrier as a baseline for processing for reception in order to reduce the WMSS and/or DFE power consumption at the UE 115, as using multiple component carriers may use more processing power across parallel DFE processing paths. However, in such examples, a single component carrier may not be scalable or followed by a cellular cell deployment. In other examples, a UE 115 may utilize carrier aggregation via multiple component carriers to reduce power consumption at the UE 115. However, in such other examples, the UE 115 may require a complex DFE design in order to support multiple carrier aggregation scenarios. Because of the flexibility and worst-case dimensioning of the design, architecture, or configuration of the DFE for the multiple carrier aggregation scenarios, the UE 115 may not be capable of exploiting the full DFE power consumption reduction potential. For example, even with dynamic bandwidth adaptation, some UEs 115 may not be capable of some DFE power reduction techniques for a smaller bandwidth allocation on one or multiple component carriers. Particularly for reception of relatively narrowband signals with a corresponding reduced BWP bandwidth configuration on one or more active component carriers, the UE 115 may have a limited DFE power reduction based on limited flexibility or scalability of a DFE hardware path. That is, some UEs 115 may not be capable of exploiting the full DFE power consumption reduction potential due using the same RF (e.g., analog) hardware, digital hardware, or both to receive signals with a wide range of bandwidth sizes.

The wireless communications system 100, and wireless communications systems described herein, may support at least two different kinds of component carriers, such as for communications on a sub-THz radio frequency spectrum band, including narrowband component carriers and wideband component carriers. For example, a UE 115 may be configured with a group of wideband component carriers, which may be used for high throughput data transfer. Communications on the group of wideband component carriers may consume significant power (e.g., operation on these wideband component carriers may be power hungry). Additionally, the UE 115-*a* may be configured with a narrowband component carrier, which may be used for SSB, initial acquisition or init-acq, beam management, synchronization signaling and procedures, among other signaling or procedures. In some cases, the UE 115 may be configured to use dedicated low power hardware for signaling or signal processing on the wideband component carriers.

For example, the wireless communications system 100 may implement techniques which provide for a low power UE 115 to support the reception of narrowband signals on a dedicated narrowband component carrier. In some implementations, the UE 115 may transmit an indication of a capability for the UE 115 to support narrowband control signaling over a narrowband component carrier (e.g., a component carrier designated for narrowband transmissions) that is separate from data channel signaling over one or more wideband component carriers (e.g., one or more component carriers designated for wideband transmissions). In some examples, the UE 115 may receive control signaling indicating a configuration for the narrowband component carrier based on the capability. For instance, the UE 115 may receive control signaling indicating a configuration for narrowband component carrier based on receiving an indication that the UE 115 is able to support narrowband control signaling over the narrowband component carrier. Based on the configuration, the UE 115 may monitor for the narrowband control signaling on the narrowband component carrier.

By utilizing a narrowband component carrier for narrowband control signaling, the UE 115 may reduce power consumption when operating at high frequencies, allowing for the enablement and deployment of the UE 115 at high frequencies with more feasible power usage in a wireless communications system 100. In addition, a network entity 105 may have reduced transmission power consumption for the transmission of critical narrowband signals at high frequencies, assuming the network entity 105 uses a dedicated narrowband transmission chain for the narrowband signals transmitted from a narrowband component carrier. In addition, the described techniques may enable a reduced capability operation for a UE 115 operating in high frequencies, allowing for the UE 115 to have extended battery life.

In some examples, a UE 115 may use separate receive chains to process narrowband signaling and wideband signaling. For example, the UE 115 may use a narrowband receive chain with lower power components to process narrowband signaling in addition to a wideband receive chain which is used to process wideband signaling (e.g., or non-narrowband signaling). The narrowband receive chain may include lower cost or lower power components, which may reduce power consumption to process narrowband signaling. For example, the narrowband receive chain may include a low power demodulation component based on the lower EVM requirements for the narrowband component carrier. Similarly, the narrowband receive chain may include a lower resolution or lower-rate ADC, among other lower power components. Utilizing the narrowband receive chain may reduce power consumption for narrowband signaling and significantly decrease overall UE power consumption. Some additional aspects for narrowband receive chains and wideband receive chains are described in more detail with reference to FIG. 3.

Figure 2:
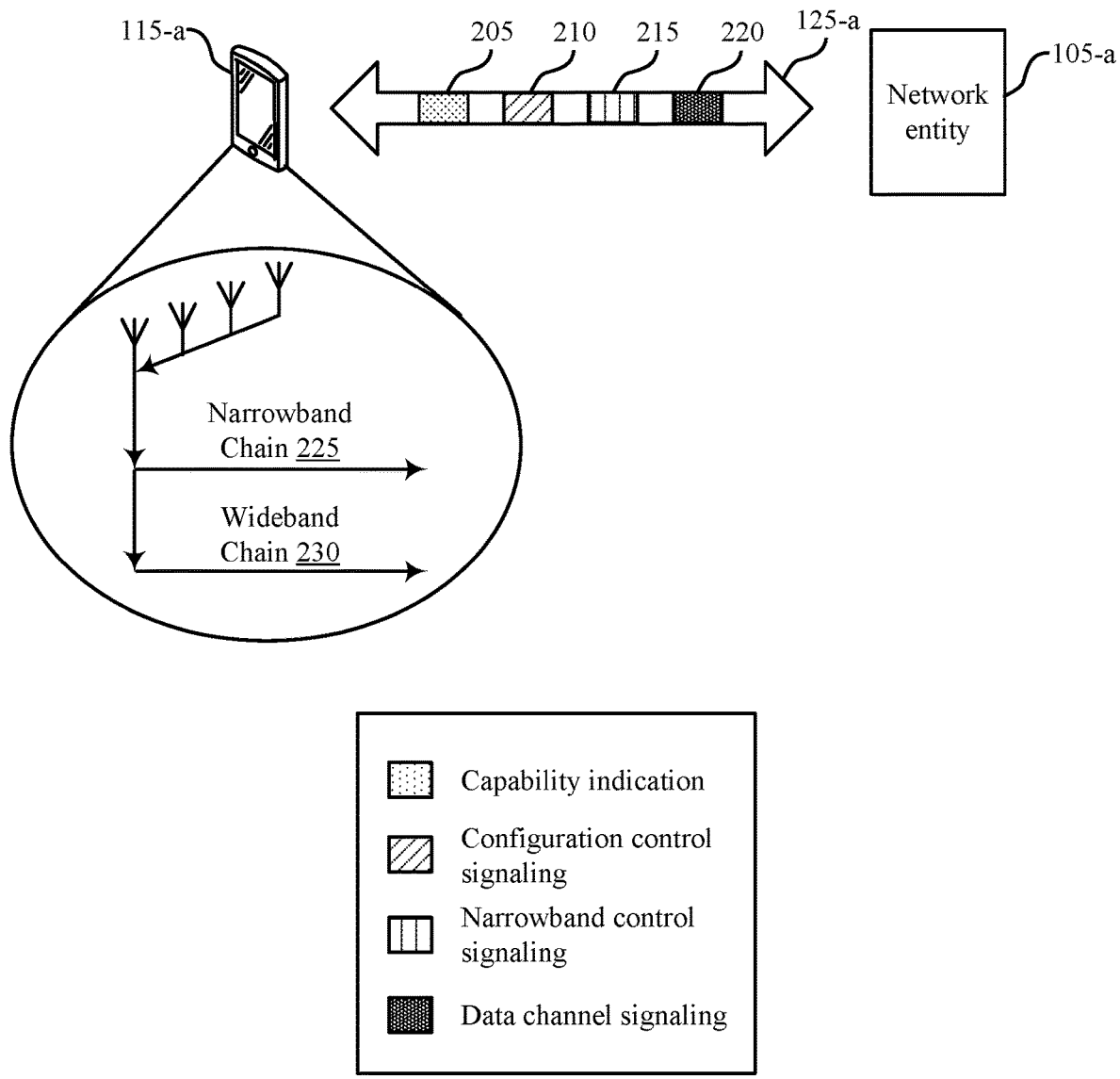
FIG. 2 illustrates an example of a wireless communications system that supports a narrowband component carrier for low power user equipment in accordance with one or more aspects of the present disclosure.

FIG. 2 illustrates an example of a wireless communications system 200 that supports a narrowband component carrier for low power user equipment in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a network entity 105-*a*, which may be examples of corresponding devices described herein. In some examples, the wireless communications system 200 may support communications on a sub-THz band. In some examples, the UE 115-*a* may monitor for narrowband control signaling on a narrowband cell carrier based on a configuration and receive data signaling on one or more wideband component carriers via a communication link 125-*a*.

In some examples, the UE 115-*a* may utilize a channel at a very high frequency, such as a channel in a sub-Thz band. Channels at very high frequencies may have low doppler spread characteristics and may, in some cases, be static or low mobility channels. Based on the channel characteristics (e.g., low doppler spread, static or low mobility) of these channels, the UE 115-*a* may perform synchronization and beam management related measurements using reference signals on smaller bandwidth allocations. Small bandwidth allocations (e.g., on narrowbands) for reference signals or control signaling may be more efficient or have lower overhead than performing this signaling on higher frequency bands. The UE 115-*a* and the network entity 105-*a* may communicate, for example, control signaling, synchronization signal blocks, initial acquisition related signals, synchronization, and beam management reference signals on a narrowband. However, in some examples, narrowband signals may be conveyed over channels at high frequencies, such as on a sub-Thz band, to provide larger signal bandwidth.

In some examples, transmissions on different radio frequency spectrum bands may be associated with different requirements. For example, narrowband transmissions may have relaxed, or higher, EVM requirements compared to transmissions on wider band channels (e.g., on sub-THz bands), examples of which are described below. For example, the UE 115-*a* may receive, as narrowband transmissions, control channel data (e.g., on a narrowband) with a high reception EVM. In some aspects, the UE 115-*a* may receive, as narrowband transmissions, control channel data with a high reception EVM due to using a robust modulation coding scheme (MCS) for a control channel. Additionally, or alternatively, a UE 115-*a* may receive, as narrowband transmissions, synchronization signal block (SSB) signal with high reception EVM requirements (e.g., compared to PDSCH requirements) without significantly impacting SSB processing outcomes (e.g., initial acquisition, SSB-based synchronization loops maintenance, beam management procedures, and the like). In some examples, the UE 115-*a* may receive, as narrowband transmissions, tracking reference signals (TRSs) and beam management CSI-RSs with high reception EVM requirements without significantly impacting other synchronization and beam management related measurements of reference signals (e.g., for low- or mid-SNR regimes for the UE 115-*a*). Because the UE 115-*a* may use nearly flat (e.g., low) and mostly static channels when operating on high frequencies, the UE 115-*a* may use TRS for synchronization loops maintenance instead of for channel characteristics estimation (e.g., as for lower bands deployments). Since the UE 115-*a* may use TRSs for synchronization loops maintenance, TRS may be considered as a narrowband signal.

In some examples, the UE 115-*a*, the network entity 105-*a*, or both may set different EVM targets for different component carriers that may be used to receive different transmissions. For instance, the UE 115-*a* may allocate non-PDSCH narrowband signals to a narrowband component carrier with relaxed EVM requirements, and the UE 115-*a* may allocate other signals (e.g., wideband PDSCH signals, other reference signals) to one or more wideband component carriers (e.g., component carriers other than the narrowband component carrier) with less relaxed EVM requirements.

The narrowband component carrier may have a lower bandwidth compared to the one or more wideband component carriers. In some examples, the narrowband component carrier may be an example of, or referred to as, a primary component carrier. In some aspects, the narrowband component carrier may be associated with a predefined, or preconfigured, limited maximum bandwidth, which may enable the UE 115-*a* to use a dedicated low power, low bandwidth component carrier to monitor for narrowband transmissions. The UE 115-*a* may support a narrowband component carrier with a reduced maximum allowed bandwidth to provide flexibility for various scenarios (e.g., allocating different bandwidths on different slots, for allocating bandwidths to different reference signals, for allocating bandwidths to control signaling with or without other allocations on the same slot). In some examples, the relaxed EVM requirements and the limited maximum bandwidth may be pre-defined for the narrowband component carrier.

In some examples, the UE 115-*a* may transmit or receive signals on one or more dedicated transmission or reception hardware paths. The one or more dedicated hardware paths may be associated with the component carriers on which the signals may be transmitted or received. For example, the UE 115-*a* may use a dedicated low power reception hardware path, such as a narrowband chain 225, for reception of the narrowband transmissions on the narrowband component carrier. Additionally, or alternatively, the UE 115-*a* may use a wideband chain 230 for reception of the wideband transmissions on the one or more wideband component carriers. The narrowband chain 225 may be a narrowband receive chain that includes one or more ADCs with low resolution and low-rate, a DFE and/or analog front-end (AFE) with low power and low complexity, a demodulator including demodulation and decoding related blocks that are at least partially low power and low complexity, and any combination thereof. Because the narrowband component carrier may have relaxed EVM requirements, the narrowband chain 225 may serve as a dedicated low complexity and low power consumption reception path for reception of narrowband signals, reducing overall power consumption for reception at the UE 115-*a*. Additionally, or alternatively, the network entity 105-*a* may perform more power-efficient transmissions of the narrowband component carrier due to the relaxed EVM requirements. For instance, the network entity 105-*a* may apply lower back off to the power amplifiers used to send transmissions due to the relaxed EVM requirements, increasing the power efficiency of the power amplifiers. Some additional aspects for the narrowband chain 225 and the wideband chain 230 are described in more detail with reference to FIG. 3.

Based on narrowband signals being used for some downlink signaling, along with the higher bandwidth sizes which may be used for data traffic for a UE 115-*a* operating on high frequencies, the UE 115-*a* may use the narrowband chain 225 for reception of narrowband transmissions and the wideband chain 230 for reception of wideband transmissions. For example, the UE 115-*a* may transmit a capability indication 205 to the network entity 105-*a* to indicate the capability for the UE 115-*a* to support narrowband control signaling over a narrowband component carrier that is separate from data channel signaling over one or more wideband component carriers. In some examples, the capability indication may include an indication of a first EVM associated with the narrowband component carrier. Additionally, or alternatively, the capability indication may include an indication of a second EVM associated with the one or more wideband component carriers. In some examples, the EVM associated with the narrowband component carrier may be higher than a second EVM associated with the one or more wideband component carriers.

In some examples, the UE 115-*a* may receive a configuration control signaling 210 from the network entity 105-*a*. The configuration control signaling 210 may be a control signaling that indicates a configuration for the narrowband component carrier. The network entity 105 may transmit the configuration control signaling 210 based on the capability indication 205, indicating that the UE 115-*a* supports the narrowband component carrier. In some examples, the configuration control signaling 210 may indicate a frequency domain resource allocation (FDRA) field to indicate frequency domain resources for the narrowband component carrier. For instance, the FDRA field of the configuration may indicate an allocated frequency band for the narrowband component carrier. In some aspects, control search spaces may be defined on the narrowband component carrier. For instance, the configuration indicated by the configuration control signaling 210 may indicate a first space set of the narrowband component carrier. Additionally, or alternatively, the configuration may indicate a second search space set of the wideband component carrier. The first search space set of the narrowband component carrier may include more symbols than a second search space set of a wideband component carrier of the one or more wideband component carriers.

In some examples, the UE 115-*a* may monitor for narrowband control signaling 215 on the narrowband component carrier based on the configuration indicated by the configuration control signaling 210. The narrowband control signaling 215 may be used for control or data signaling for activated component carriers, including the one or more wideband component carriers. In some examples, the UE 115-*a* may monitor the narrowband component carrier based on the FDRA field indicated by the configuration indicated by the configuration control signaling 210. Additionally, or alternatively, the UE 115-*a* may monitor for the narrowband control signaling 215 in the first search space set of the narrowband component carrier. The UE 115-*a* may monitor for the narrowband control signaling 215 to receive the narrowband control signaling 215 on the narrowband component carrier.

In some examples, the UE 115-*a* may process the narrowband control signaling on a narrowband receive chain (e.g., the narrowband chain 225) that is separate from a wideband receive chain (e.g., the wideband chain 230). In some examples, the UE 115-*a* may activate the narrowband chain 225 to allow for processing and monitoring of the narrowband control signaling 215 on the narrowband chain 225. While the UE 115-*a* monitors for and processes the narrowband control signaling 215 on the narrowband component carrier, and in some cases during time periods without data scheduling for the UE 115-*a* on the one or more wideband component carriers, the wideband chain 230 may be inactive, reducing power consumption at the UE 115-*a*. In some examples, the UE 115-*a* may receive data channel signaling using the wideband receive chain 230 associated with the one or more wideband component carriers.

In some examples, the UE 115-*a* support cross-carrier scheduling to receive data channel signaling on the one or more wideband component carriers. For example, the UE 115-*a* may receive the narrowband control signaling 215 including a downlink grant. The downlink grant may allocate a downlink shared channel (e.g., a PDSCH) resource on a wideband component carrier of the one or more wideband component carriers. For example, the UE 115-*a* may receive a downlink shared channel transmission, such as a data channel signaling 220, on the downlink shared channel resource that is associated with the wideband component carrier based on the downlink grant received on the narrowband component carrier. Additionally, or alternatively, the UE 115-*a* may receive a downlink grant on the narrowband component carrier allocating a downlink shared channel resource on the narrowband component carrier. For example, the UE 115-*a* may receive data on the narrowband component carrier to utilize any unused resources on the narrowband component carrier. In some cases, data transmitted on the narrowband component carrier may be encoded in accordance with a modulation and coding scheme that considers (e.g., satisfies) a limited or targeted EVM available on the narrowband receive chain 225 of the UE 115-*a*.

In some cases, channels at a higher frequency may have higher numerologies than in other frequency bands (e.g., frequency range 2 (FR2)) to better mitigate a strong phase noise expected at higher frequencies (e.g., the sub-THz band). In some examples, the UE 115-*a* may use 3 OFDM symbols to monitor for control signaling on a component carrier at the other frequency bands, but the UE 115-*a* may use a greater number of OFDM symbols (e.g., 5 OFDM symbols) to monitor for control signaling on a narrowband component carrier at the higher frequencies (e.g., the sub-Thz band). In some aspects, the higher numerology of the search spaces that the UE 115-*a* may use when operating on higher frequencies may have shorter durations than the search spaces which the UE 115-*a* may use when operating on lower frequencies. For example, the OFDM symbols that the UE 115-a may use to monitor for control signaling on the narrowband component carrier may have a shorter OFDM symbol or slot time duration.

In some examples, based on the shorter symbol or slot time duration associated with the search spaces used by the UE 115-a at high frequencies, the UE 115-a may experience beam management and hardware-related limitations. As a result of the beam management and hardware-related limitations at high frequencies, there may be a time gap (e.g., K>0) between the UE 115-a receiving the downlink grant on the narrowband component carrier and receiving the data channel signaling 220.

In some examples, the UE 115-a may perform beam management by selecting a beam from multiple available beams during the time gap, and the UE 115-a may receive the downlink shared channel transmission via the selected beam. For instance, the configuration indicated by the configuration control signaling 210 may indicate a time duration associated with the time gap. In some examples, the UE 115-a may perform beam management during the time gap based on the time duration indicated by the configuration to select a beam of a set of multiple available beams, and the UE 115-a may receive the downlink shared channel transmission (e.g., the data channel signaling 220) by using the selected beam.

In some aspects, the UE 115-a may trigger demodulation of the downlink shared channel transmission, such as the data channel signaling 220, via the downlink shared channel resource of the wideband component carrier based at on receiving the downlink grant on the narrowband component carrier. Because activation of the downlink shared channel resource on the wideband component carrier may be triggered when relevant data scheduling is detected for the UE 115-a specifically, the UE 115-a may implement a more power efficient mode of operation by receiving and demodulating the downlink shared channel transmission based on receiving the downlink grant on the narrowband component carrier. Therefore, the time gap may provide more power efficient demodulation on wideband component carriers for the UE 115-a. Additionally, or alternatively, by using the time gap to perform beam management to select a beam for receiving the downlink shared channel transmission (e.g., the data channel signaling 220), the UE 115-a may experience a clearer subdivision between control and data processing. For example, the narrowband chain 225 may be activated at the UE 115-a for monitoring for and processing the narrowband control signaling on the narrowband component carrier. Additionally or alternatively, other processing resources, such as one or more components of the wideband chain 230, may be inactive during time periods which may contribute to lower power consumption at the UE 115-a (e.g., during time periods without data scheduling for the UE 115-a).

Figure 3:
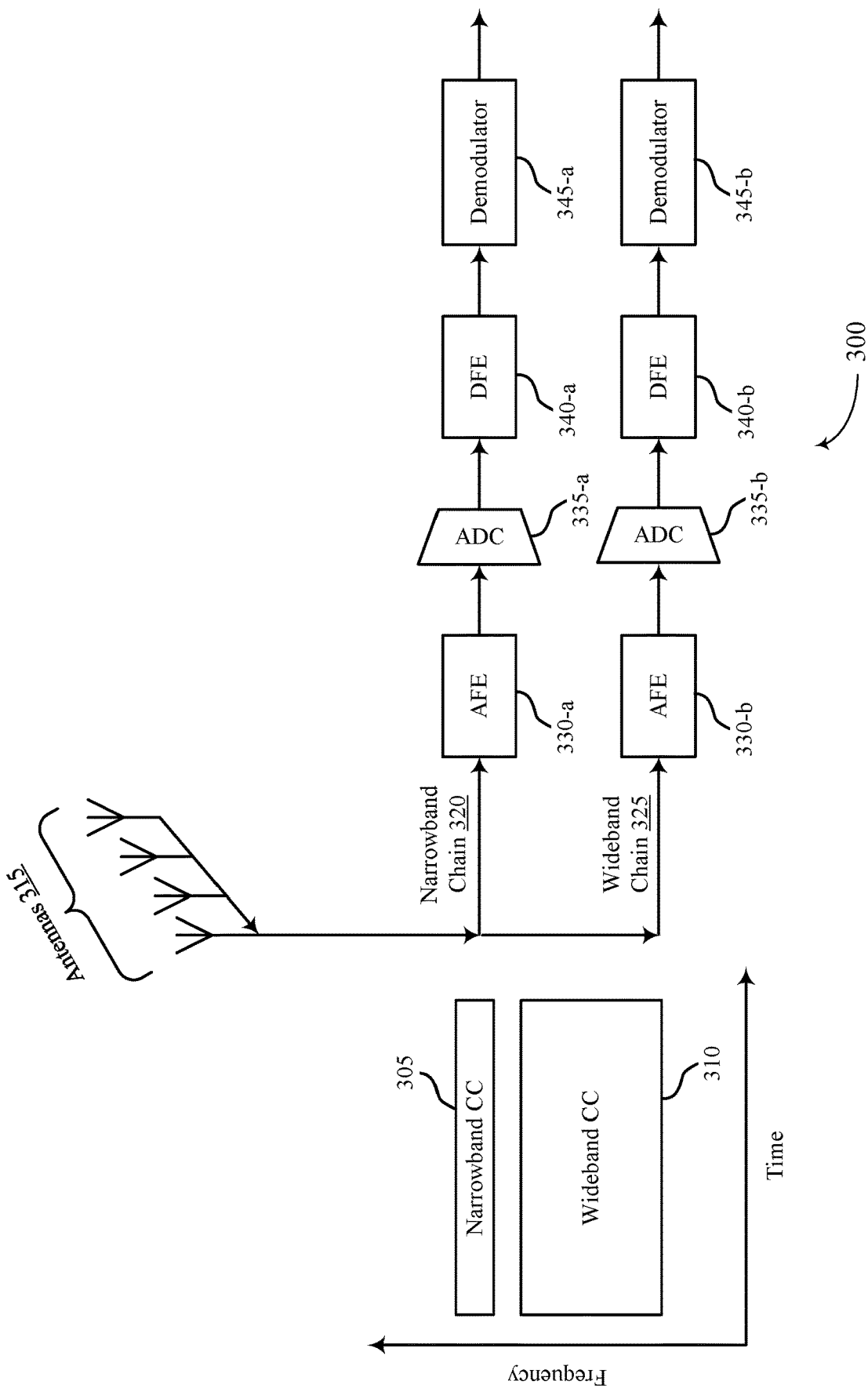
FIG. 3 illustrates an example of separate receive chains that supports a narrowband component carrier for low power user equipment in accordance with one or more aspects of the present disclosure.

FIG. 3 illustrates an example of separate receive chains 300 that supports a narrowband component carrier for low power user equipment in accordance with one or more aspects of the present disclosure. In some examples, the separate receive chains 300 may be implemented by aspects of the wireless communications systems 100 and 200. For example, a UE, such as a UE 115 as described with reference to FIG. 1 or a UE 115-a as described with reference to FIG. 2, may implement a narrowband chain 320 used to monitor for narrowband control signaling, and the UE may implement a wideband chain 325 to receive downlink shared channel transmissions.

In some examples, a UE may transmit an indication of a capability for the UE to support narrowband control signaling over a narrowband component carrier 305 and separate from data channel signaling over one or more wideband component carriers which may include a wideband component carrier 310. Based on the capability, the UE may receive control signaling indicating a configuration for the narrowband component carrier 305 via antennas 315. In some aspects, the narrowband component carrier 305 may be a primary component carrier. Additionally, or alternatively, the one or more wideband component carriers may be secondary component carriers. In some examples, the narrowband component carrier 305 may be configured with a relatively low bandwidth compared to other component carriers in accordance with the indicated configuration. For example, the narrowband component carrier may be configured with a constant, predefined maximum bandwidth limit. Based on the configuration, the UE may monitor for the narrowband control signaling on the narrowband component carrier 305.

Some UEs may include a dedicated path option for narrowband processing (e.g., initial acquisition processing) via certain components of a hardware path, such as a DFE and/or a demodulator. For example, in some cases, a UE may include a narrowband chain to be used for some part of digital processing within a DFE block, and the narrowband chain may be used for specific reception scenarios (e.g., synchronization signal block processing). In such cases, the UE may use the same wideband digital hardware (e.g., high rate ADC) and wideband analog hardware (e.g., high rate AFE) for other reception scenarios. In contrast, the UE described herein may include the narrowband chain 320, a dedicated, fully narrowband hardware chain that may serve as a dedicated path option including narrowband digital and analog hardware designated for narrowband processing by the UE. For example, the narrowband chain 320 may include an AFE 330-a, an ADC 335-a, a DFE 340-a, a demodulator 345-a, or any combination thereof, unique to the narrowband chain 320.

In some examples, the UE may monitor for the narrowband control signaling on the narrowband component carrier 305 by receiving the narrowband control signaling (e.g., synchronization signal block signaling, initial access signaling, scheduling signaling, reference signaling allocation signaling) on the narrowband component carrier 305 and processing the narrowband control signaling using the narrowband chain 320. In some examples, the narrowband chain 320 may include digital and analog hardware components designed for reception of narrowband control signaling with a higher, and thus, more relaxed, EVM targets and/or characteristics. In some aspects, the UE and a network entity in communication with the UE may be aware of the EVM requirements associated with the narrowband component carrier 305. Alternatively, the UE may indicate the EVM requirements associated with the narrowband component carrier 305 via capability signaling. The digital and analog hardware components of the narrowband chain 320, such as the AFE 330-a, the ADC 335-a, the DFE 340-a, and the demodulator 345-a, may have low power, low bandwidth, low rate, and low complexity characteristics due to the relaxed EVM requirements for the narrowband component carrier 305.

For example, the UE may apply a low power back off to low noise amplifiers and/or power amplifiers included in the AFE 330-a due to the relaxed EVM requirements, contributing to reduced power consumption by the AFE 330-a. Accordingly, the design of the AFE 330-a may allow for a power efficient tradeoff between power efficiency and EVM requirements, as well as relatively low cost. Additionally or alternatively, the ADC 335-*a* may have a low resolution and a low rate such that the ADC 335-*a* may be used for receiving narrowband control signaling with higher allowed EVM. Additionally or alternatively, the DFE 340-*b* may be narrowband optimized and include a lower samples bit representation width that is supported along the digital processing steps (e.g., higher EVM threshold). Additionally or alternatively, the demodulator 345-*b* may include low complexity and low power demodulation blocks, as well as optimized small size FFT and/or inverse discrete Fourier transform (IDFT) implementations.

In some examples, the UE may receive downlink shared channel transmissions (e.g., wideband PDSCH signals and related LA RS transmissions) on one or more other wideband component carriers. For example, the UE may receive a downlink grant on the narrowband component carrier 305 based on monitoring the narrowband component carrier 305. In some aspects, downlink grant may allocate a downlink shared channel resource on the wideband component carrier 310 of the one or more wideband component carriers. Based on receiving the downlink grant, the UE may receive a downlink shared channel transmission on the allocated downlink shared channel resource located on the wideband component carrier 210. In some examples, the wideband component carrier may be associated with lower, or less relaxed, EVM requirements as the narrowband component carrier. For example, the EVM target for the wideband component carrier 310 may be lower than the EVM target for the narrowband component carrier 305. The UE may receive the downlink shared channel transmission on the wideband component carrier 310 and process the downlink shared channel transmission using a wideband receive chain, such as the wideband chain 325. In some examples, the wideband chain 325 may include an AFE 330-*b*, and ADC 335-*b*, a DFE 340-*b*, and a demodulator 345-*b*. The digital and analog hardware components of the wideband chain 325, such as the AFE 330-*b*, the ADC 335-*b*, the DFE 340-*b*, and the demodulator 345-*b*, may have higher power, larger bandwidth, higher rate, and higher complexity characteristics due to the tighter, less relaxed EVM requirements for the wideband component carrier 310.

In some examples, the UE may receive a downlink shared channel transmission on a downlink shared channel resource on the narrowband component carrier 305. For example, based on monitoring for the narrowband control signaling, the UE may receive a downlink grant on the narrowband component carrier 305, and the downlink grant may allocate a downlink shared channel resource on the narrowband component carrier 305. Based on the downlink grant, the UE may receive a downlink shared channel transmission on the downlink shared resource in accordance with the MCS associated with the narrowband component carrier. In some cases, narrowband data allocations may be provided on the narrowband component carrier 305 to utilize unused resources remaining on the narrowband component carrier 305, so long as the limited and/or targeted EVM available on the narrowband chain 320 are accounted for by the MCS selection for the narrowband data allocations.

In some aspects, the UE may use the narrowband component carrier, assumed to be the primary component carrier, as the single active component carrier if the UE is low on battery supply to preserve connectivity of the UE with the network with some limited data traffic, increasing the remaining battery life of the UE. Additionally or alternatively, the UE may use the narrowband component carrier in scenarios where the UE is a reduced capability device or an IoT device because such devices are associated with deteriorated (e.g., relaxed) EVM characteristics and bandwidth limitations.

Figure 4:
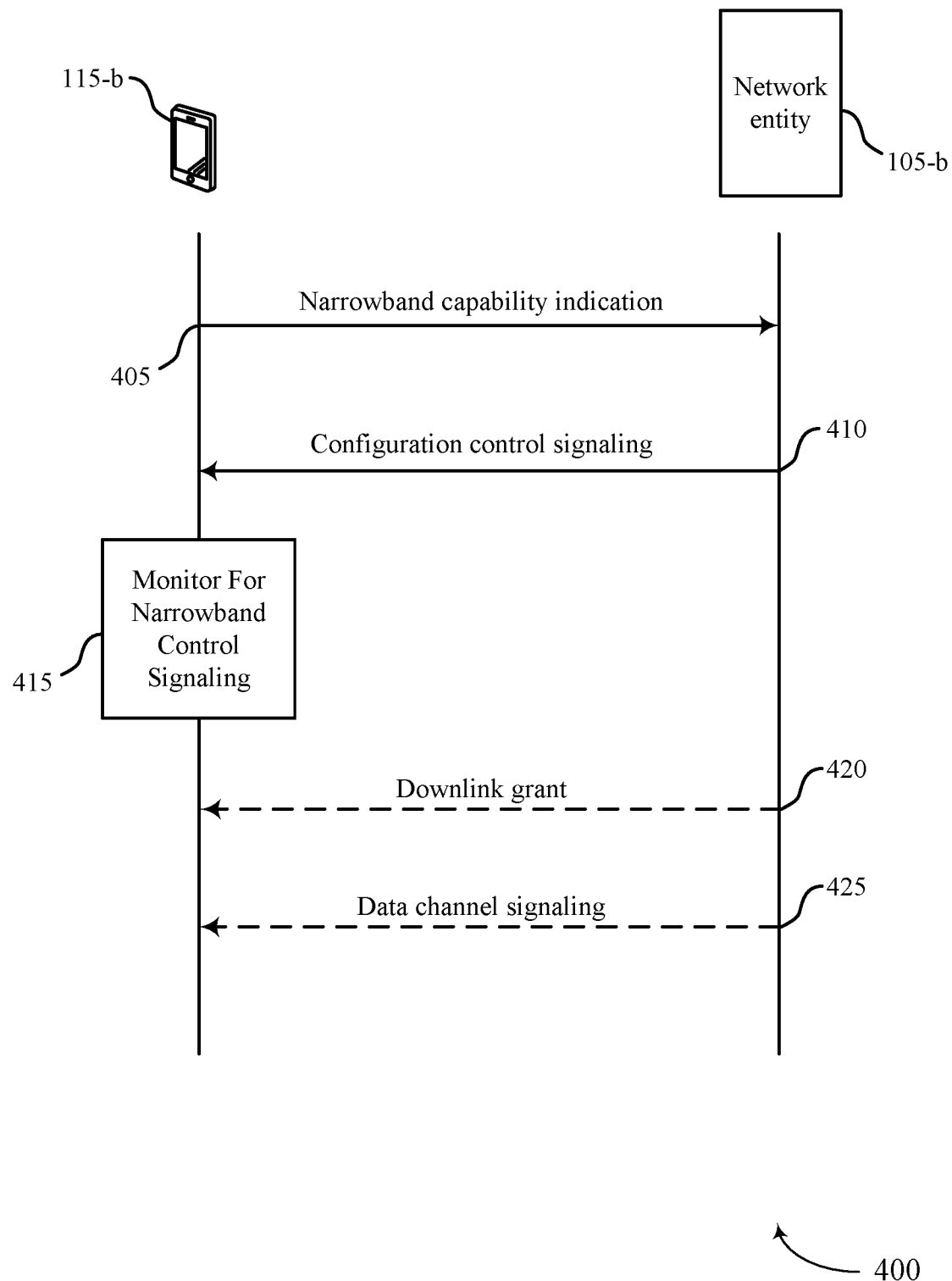
FIG. 4 illustrates an example of a process flow that supports a narrowband component carrier for low power user equipment in accordance with one or more aspects of the present disclosure.

FIG. 4 illustrates an example of a process flow 400 that supports a narrowband component carrier for low power user equipment in accordance with one or more aspects of the present disclosure. The process flow 400 may implement aspects of wireless communications systems 100 and 200, or may be implemented by aspects of the wireless communications system 100 and 200. For example, the process flow 400 may illustrate operations between a UE 115-*c* and a network entity 105-*b*, which may be examples of corresponding devices described herein. In the following description of the process flow 400, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 400, and other operations may be added to the process flow 400.

At 405, the UE 115-*b* may transmit, and the network entity 105-*b* may receive, a narrowband capability indication. For example, the UE 115-*b* may transmit an indication of a capability for the UE 115-*b* to support narrowband control signaling over a narrowband component carrier that is separate from data channel signaling over one or more wideband component carriers. In some examples, the UE 115-*b* may transmit an indication of a first EVM associated with the narrowband component carrier. The first EVM associated with the narrowband component carrier may be higher than a second EVM associated with one or more wideband component carriers.

At 410, the network entity 105-*b* may transmit, and the UE 115-*b* may receive, a configuration control signaling. For example, the UE 115-*b* may receive control signaling indicating a configuration for the narrowband component carrier based on the capability indicated at 405. In some examples, the configuration may indicate a first search space set that may be associated with the narrowband component carrier. The first search space set may include more symbols than a second search space set of a wideband component carrier of the one or more wideband component carriers. Additionally or alternatively, the configuration may include an FDRA field that may identify the narrowband component carrier. Additionally or alternatively, the configuration may indicate a time duration associated with a time gap that may occur between the reception of a downlink grant on a narrowband component carrier and the reception of a downlink shared channel transmission via a downlink shared channel resource on a wideband component carrier.

At 415, the UE 115-*b* may monitor for the narrowband control signaling on the narrowband component carrier based on the configuration indicated at 410. In some examples, the UE 115-*b* may monitor for the narrowband control signaling by monitoring for the narrowband control signaling in the first search space set of the narrowband component carrier. Additionally or alternatively, the UE 115-*b* may monitor the narrowband component carrier based on the FDRA field indicated by the configuration. In some examples, the UE 115-*b* may receive the narrowband control signaling on the narrowband component carrier. Additionally or alternatively, the UE 115-*b* may process the narrowband control signaling using a narrowband receive chain that is separate from a wideband receive chain that is associated with the one or more wideband component carriers. In some examples, the wideband receive chain associated with the one or more wideband component carriers may be inactive while processing the narrowband control signaling using the narrowband receive chain. In some aspects, monitoring for the narrowband control signaling may include receiving synchronization signal block signaling, initial access signaling, scheduling signaling, reference signal allocation signaling, or any combination thereof on the narrowband component carrier.

At 420, the network entity 105-*b* may transmit, and the UE 115-*b* may receive, a downlink grant on the narrowband component carrier based on monitoring the narrowband component carrier. In some examples, the downlink grant may allocate a downlink shared channel resource on a wideband component carrier of the one or more wideband component carriers. In other examples, the downlink grant may allocate a downlink shared channel resource on the narrowband component carrier. In some aspects, during a time gap between receiving the downlink gap on the narrowband component carrier and receiving the downlink shared channel transmission via the downlink shared channel resource of the wideband component carrier or the narrowband component carrier, respectively, the UE 115-*b* may perform beam management to select a beam of a plurality of available beams.

At 425, the network entity 105-*b* may transmit, and the UE 115-*b* may receive, data channel signaling. For example, based on receiving the downlink grant at 420, the UE 115-*b* may receive a downlink shared channel transmission on the downlink shared channel resource on the narrowband component carrier or the wideband component carrier, respectively. In some examples, the UE 115-*b* may receive the downlink shared channel transmission via the selected beam. Additionally or alternatively, the UE 115-*b* may trigger demodulation of the downlink shared channel transmission via the downlink shared channel resource of the narrowband component carrier or the wideband component carrier, respectively, based on receiving the downlink grant on the narrowband component carrier.

Figure 5:
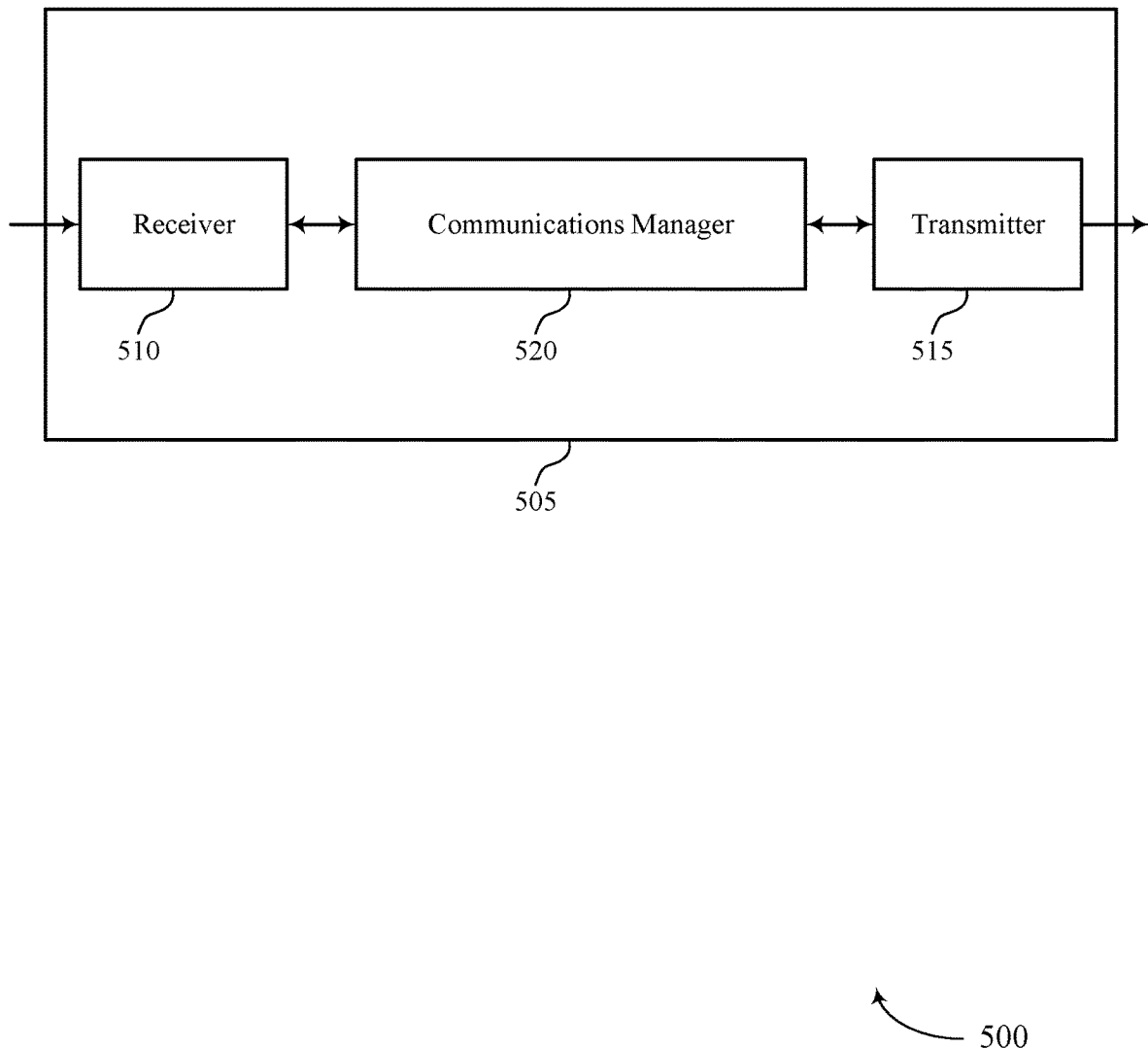
FIGS. 5 and 6 show block diagrams of devices that support a narrowband component carrier for low power user equipment in accordance with one or more aspects of the present disclosure.

FIG. 5 shows a block diagram 500 of a device 505 that supports a narrowband component carrier for low power user equipment in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to a narrowband component carrier for low power user equipment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to a narrowband component carrier for low power user equipment). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of a narrowband component carrier for low power user equipment as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for transmitting an indication of a capability for the UE to support narrowband control signaling over a narrowband component carrier that is separate from data channel signaling over one or more wideband component carriers. The communications manager 520 may be configured as or otherwise support a means for receiving control signaling indicating a configuration for the narrowband component carrier based on the capability. The communications manager 520 may be configured as or otherwise support a means for monitoring for the narrowband control signaling on the narrowband component carrier based on the configuration.

By including or configuring the communications manager 520 in accordance with examples as described herein, the device 505 (e.g., a processor controlling or otherwise coupled with the receiver 510, the transmitter 515, the communications manager 520, or a combination thereof) may support techniques which reduce power consumption in systems employing high frequency (e.g., sub-THz) radio frequency spectrum bands by utilizing a narrowband component carrier as a primary component carrier. Smaller resources may be scheduled on the narrowband component carrier, reducing overhead and improving system utilization. Additionally, a UE 115 may use a separate receive chain to process signaling on the narrowband component carrier. For example, a narrowband receive chain may have lower-cost or lower-power components (e.g., a lower rate and reduced bit count ADC, a lower power LNA or PA, a narrowband-optimized DFE, a low power demodulator block with relaxed EVM requirements, or any combination thereof, among other components), which may reduce power consumption for narrowband signal reception at the UE 115.

Figure 6:
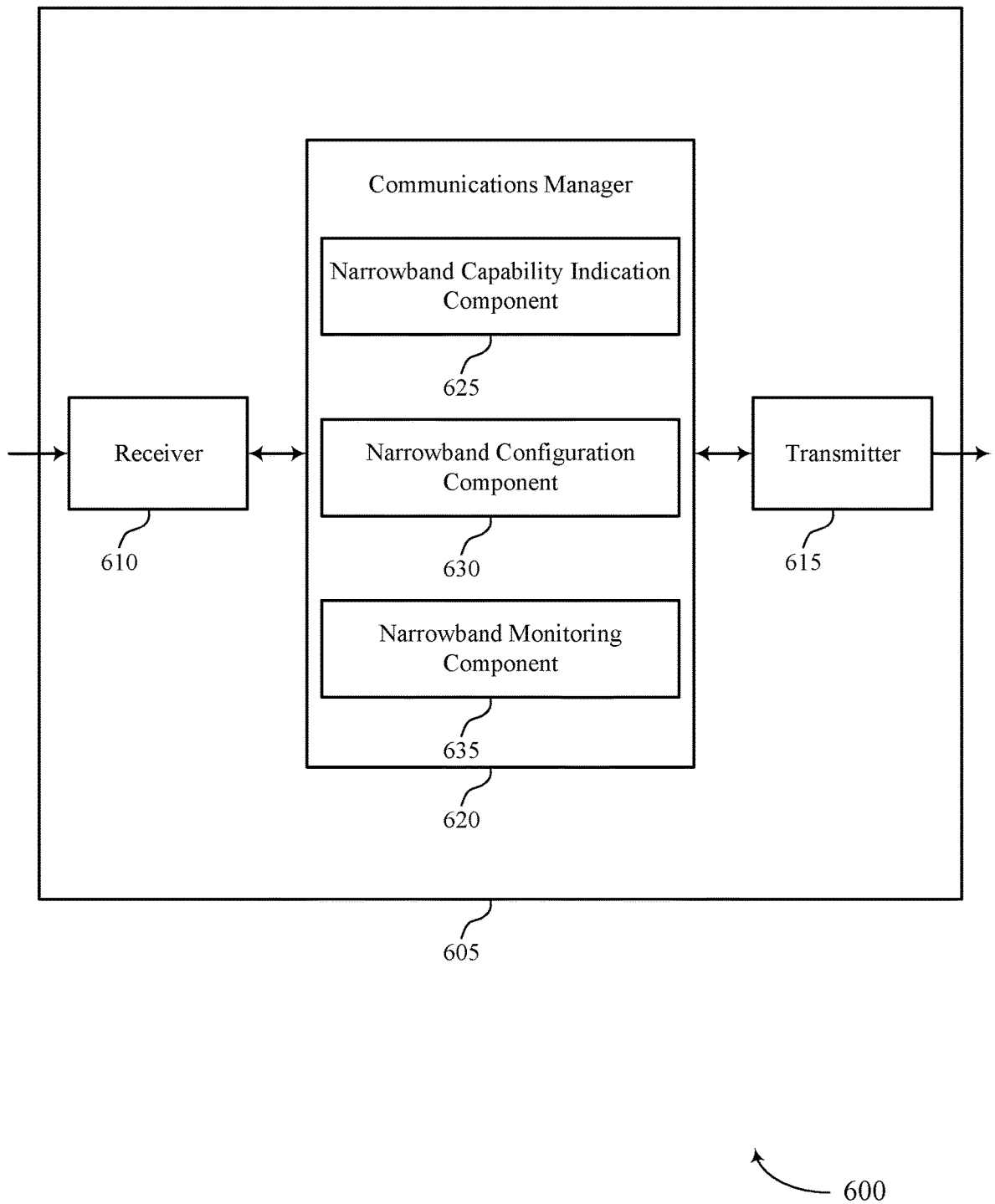

FIG. 6 shows a block diagram 600 of a device 605 that supports a narrowband component carrier for low power user equipment in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to a narrowband component carrier for low power user equipment). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to a narrowband component carrier for low power user equipment). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of a narrowband component carrier for low power user equipment as described herein. For example, the communications manager 620 may include a narrowband capability indication component 625, a narrowband configuration component 630, a narrowband monitoring component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The narrowband capability indication component 625 may be configured as or otherwise support a means for transmitting an indication of a capability for the UE to support narrowband control signaling over a narrowband component carrier that is separate from data channel signaling over one or more wideband component carriers. The narrowband configuration component 630 may be configured as or otherwise support a means for receiving control signaling indicating a configuration for the narrowband component carrier based on the capability. The narrowband monitoring component 635 may be configured as or otherwise support a means for monitoring for the narrowband control signaling on the narrowband component carrier based on the configuration.

Figure 7:
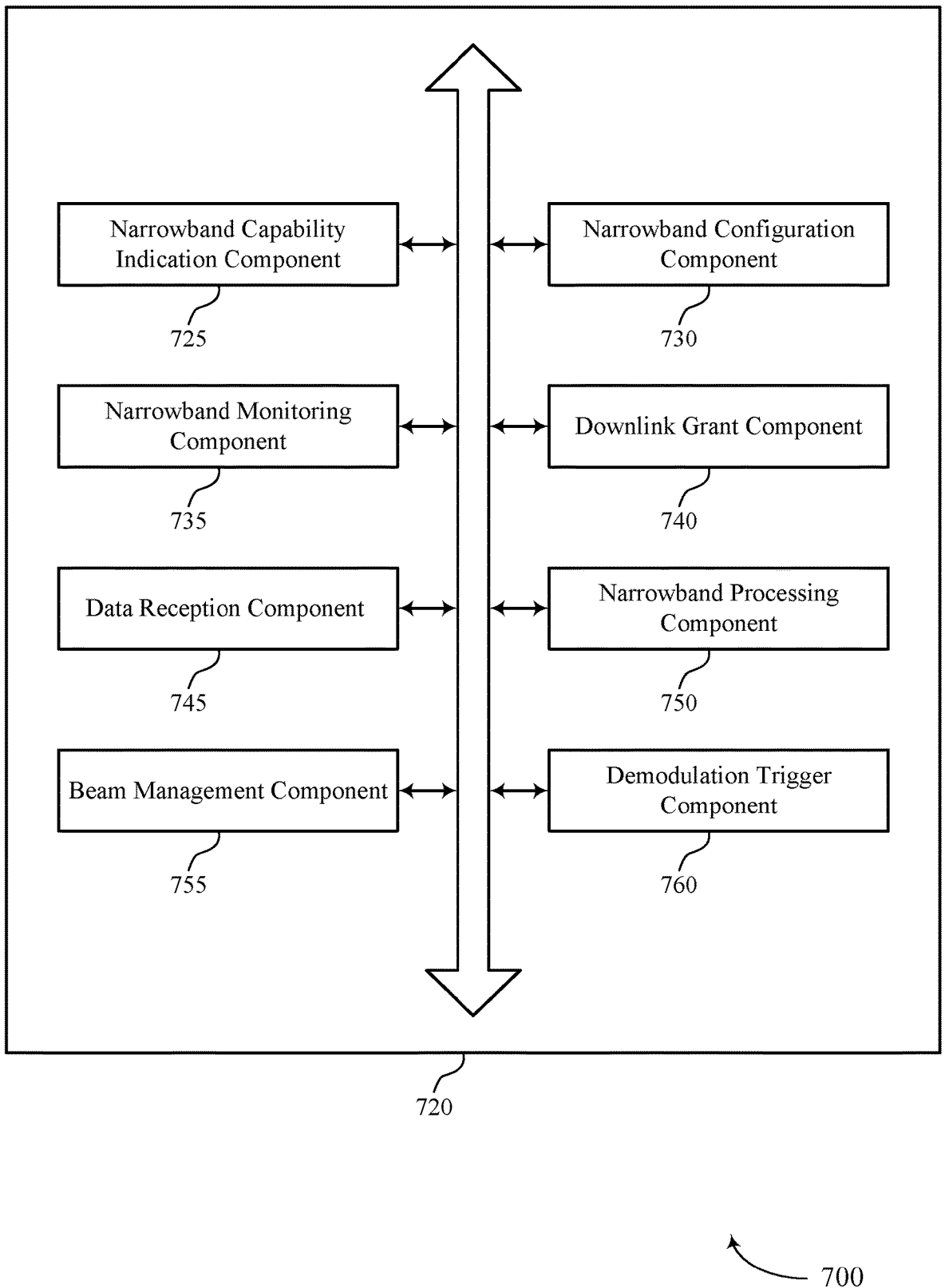
FIG. 7 shows a block diagram of a communications manager that supports a narrowband component carrier for low power user equipment in accordance with one or more aspects of the present disclosure.

FIG. 7 shows a block diagram 700 of a communications manager 720 that supports a narrowband component carrier for low power user equipment in accordance with one or more aspects of the present disclosure. The communications manager 720 may be an example of aspects of a communications manager 520, a communications manager 620, or both, as described herein. The communications manager 720, or various components thereof, may be an example of means for performing various aspects of a narrowband component carrier for low power user equipment as described herein. For example, the communications manager 720 may include a narrowband capability indication component 725, a narrowband configuration component 730, a narrowband monitoring component 735, a downlink grant component 740, a data reception component 745, a narrowband processing component 750, a beam management component 755, a demodulation trigger component 760, or any combination thereof. Each of these components may communicate, directly or indirectly, with one another (e.g., via one or more buses).

The communications manager 720 may support wireless communications at a UE in accordance with examples as disclosed herein. The narrowband capability indication component 725 may be configured as or otherwise support a means for transmitting an indication of a capability for the UE to support narrowband control signaling over a narrowband component carrier that is separate from data channel signaling over one or more wideband component carriers. The narrowband configuration component 730 may be configured as or otherwise support a means for receiving control signaling indicating a configuration for the narrowband component carrier based on the capability. The narrowband monitoring component 735 may be configured as or otherwise support a means for monitoring for the narrowband control signaling on the narrowband component carrier based on the configuration.

In some examples, the downlink grant component 740 may be configured as or otherwise support a means for receiving a downlink grant on the narrowband component carrier based on monitoring the narrowband component carrier, where the downlink grant allocates a downlink shared channel resource on a wideband component carrier of the one or more wideband component carriers. In some examples, the data reception component 745 may be configured as or otherwise support a means for receiving a downlink shared channel transmission on the downlink shared channel resource based on the downlink grant.

In some examples, the beam management component 755 may be configured as or otherwise support a means for performing beam management to select a beam of a set of multiple available beams during a time gap between receiving the downlink grant on the narrowband component carrier and receiving the downlink shared channel transmission via the downlink shared channel resource of the wideband component carrier, where the downlink shared channel transmission is received via the selected beam and where the configuration indicates a time duration associated with the time gap.

In some examples, the demodulation trigger component 760 may be configured as or otherwise support a means for triggering demodulation of the downlink shared channel transmission via the downlink shared channel resource of the wideband component carrier based on receiving the downlink grant on the narrowband component carrier.

In some examples, to support monitoring for the narrowband control signaling on the narrowband component carrier, the narrowband monitoring component 735 may be configured as or otherwise support a means for monitoring for the narrowband control signaling in a first search space set of the narrowband component carrier that includes more symbols than a second search space set of a wideband component carrier of the one or more wideband component carriers, where the configuration indicates the first search space set.

In some examples, to support monitoring for the narrowband control signaling, the narrowband monitoring component 735 may be configured as or otherwise support a means for receiving the narrowband control signaling on the narrowband component carrier. In some examples, to support monitoring for the narrowband control signaling, the narrowband processing component 750 may be configured as or otherwise support a means for processing the narrowband control signaling using a narrowband receive chain that is separate from a wideband receive chain associated with the one or more wideband component carriers.

In some examples, the wideband receive chain associated with the one or more wideband component carriers is inactive while processing the narrowband control signaling using the narrowband receive chain.

In some examples, the narrowband receive chain includes an analog front-end, an analog-to-digital converter, a digital front-end, a demodulator, or any combination thereof, unique to the narrowband receive chain.

In some examples, to support monitoring for the narrowband control signaling, the narrowband monitoring component 735 may be configured as or otherwise support a means for receiving synchronization signal block signaling, initial access signaling, scheduling signaling, reference signal allocation signaling, on the narrowband component carrier.

In some examples, to support transmitting the indication of the capability, the narrowband capability indication component 725 may be configured as or otherwise support a means for transmitting an indication of a first error vector magnitude associated with the narrowband component carrier, where the first error vector magnitude associated with the narrowband component carrier is higher than a second error vector magnitude associated with the one or more wideband component carriers.

In some examples, the downlink grant component 740 may be configured as or otherwise support a means for receiving a downlink grant on the narrowband component carrier based on monitoring for the narrowband control signaling, where the downlink grant allocates a downlink shared channel resource on the narrowband component carrier. In some examples, the data reception component 745 may be configured as or otherwise support a means for receiving a downlink shared channel transmission on the downlink shared channel resource in accordance with a modulation and coding scheme associated with the narrowband component carrier based on the downlink grant.

In some examples, to support receiving the control signaling, the narrowband configuration component 730 may be configured as or otherwise support a means for receiving the control signaling indicating the configuration that includes an FDRA field that identifies the narrowband component carrier, where the narrowband component carrier is monitored based on the FDRA field.

Figure 8:
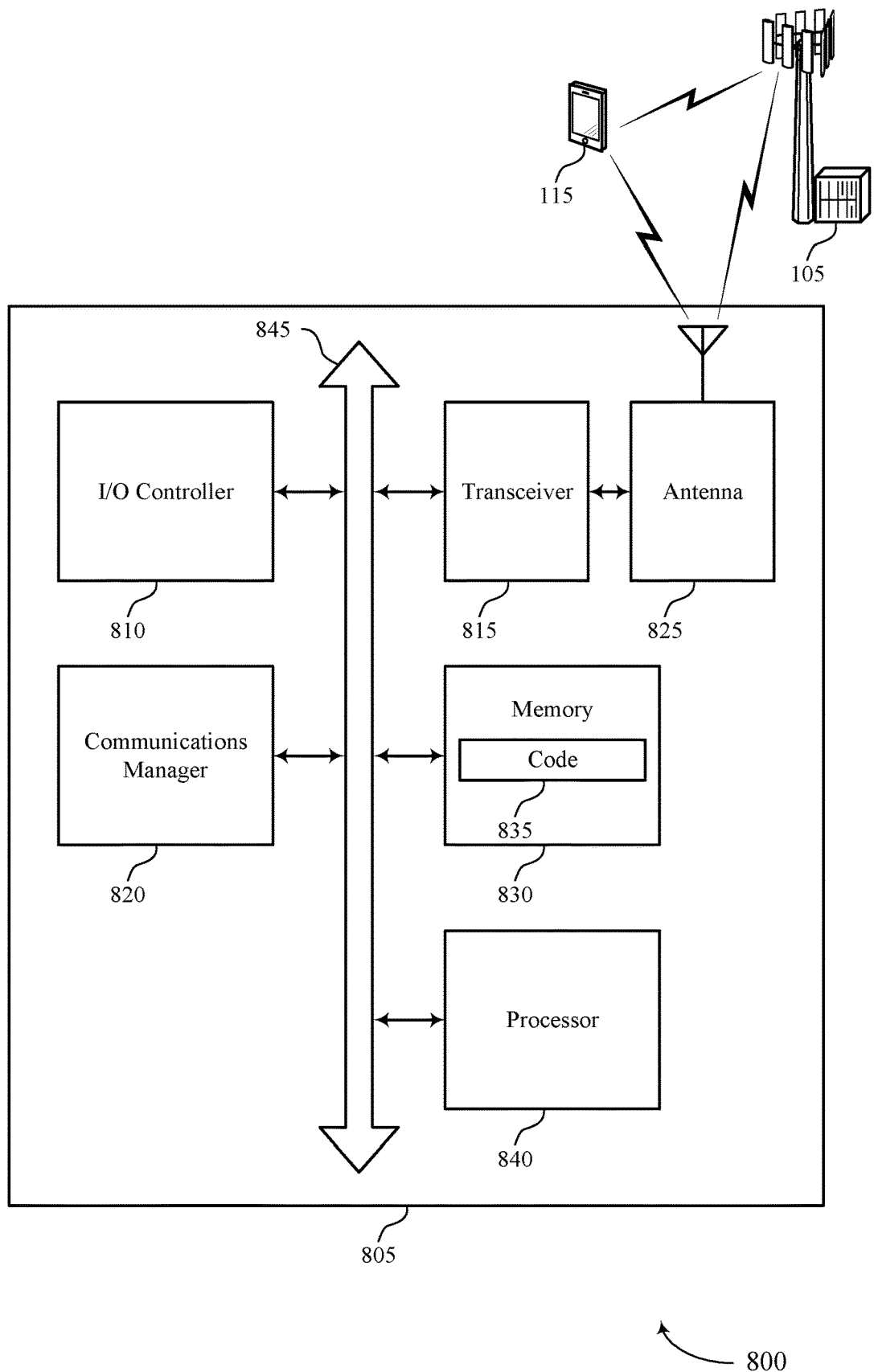
FIG. 8 shows a diagram of a system including a device that supports a narrowband component carrier for low power user equipment in accordance with one or more aspects of the present disclosure.

FIG. 8 shows a diagram of a system 800 including a device 805 that supports a narrowband component carrier for low power user equipment in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting a narrowband component carrier for low power user equipment). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting an indication of a capability for the UE to support narrowband control signaling over a narrowband component carrier that is separate from data channel signaling over one or more wideband component carriers. The communications manager 820 may be configured as or otherwise support a means for receiving control signaling indicating a configuration for the narrowband component carrier based on the capability. The communications manager 820 may be configured as or otherwise support a means for monitoring for the narrowband control signaling on the narrowband component carrier based on the configuration.

By including or configuring the communications manager 820 in accordance with examples as described herein, the device 805 may support techniques which reduce power consumption in systems employing high frequency (e.g., sub-THz) radio frequency spectrum bands by utilizing a narrowband component carrier as a primary component carrier. Smaller resources may be scheduled on the narrowband component carrier, reducing overhead and improving system utilization. Additionally, a UE 115 may use a separate receive chain to process signaling on the narrowband component carrier. For example, a narrowband receive chain may have lower-cost or lower-power components (e.g., a lower rate and reduced bit count ADC, a lower power LNA or PA, a narrowband-optimized DFE, a low power demodulator block with relaxed EVM requirements, or any combination thereof, among other components), which may reduce power consumption for narrowband signal reception at the UE 115.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of a narrowband component carrier for low power user equipment as described herein, or the processor 840 and the memory 830 may be otherwise configured to perform or support such operations.

Figure 9:
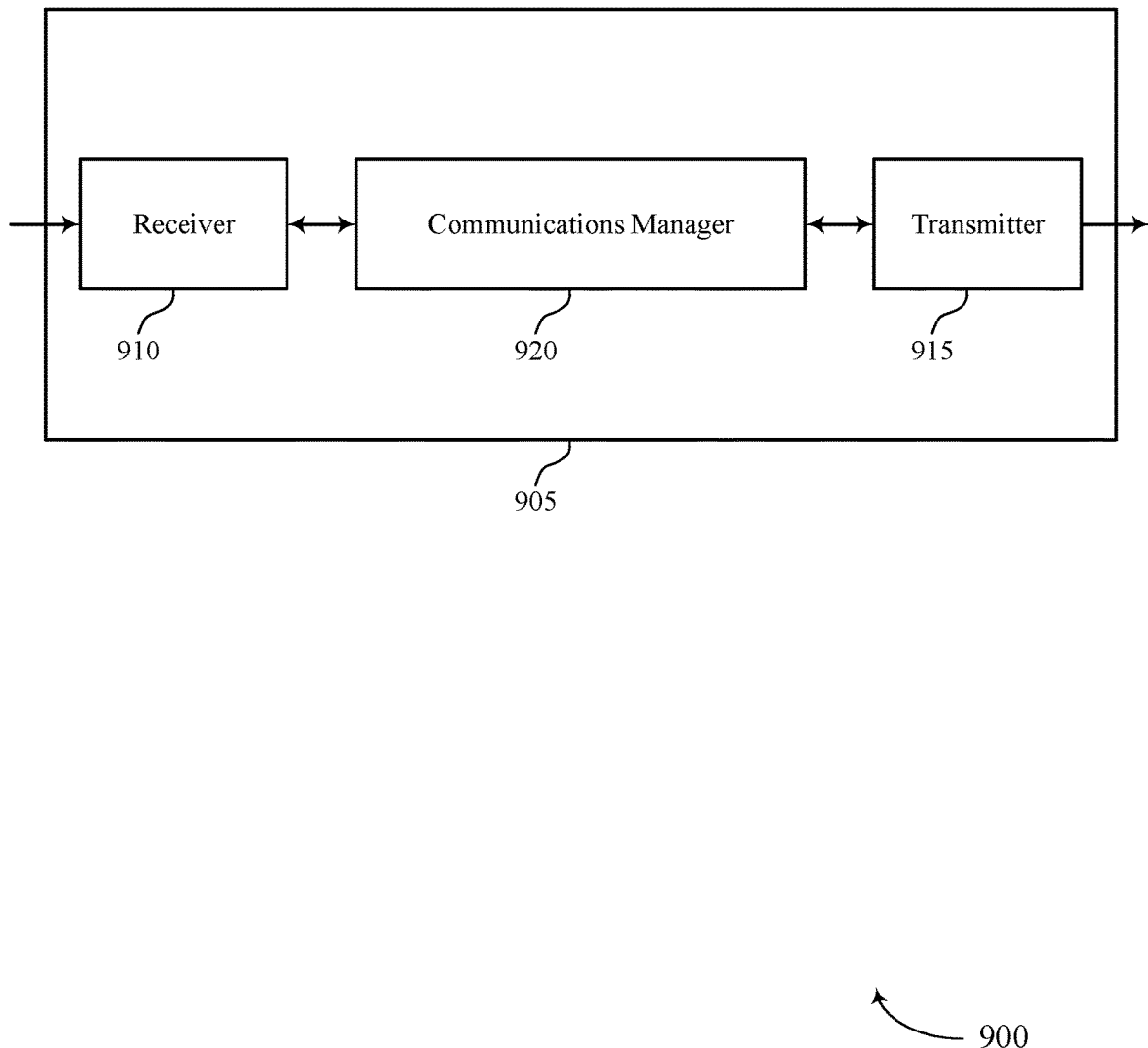
FIGS. 9 and 10 show block diagrams of devices that support a narrowband component carrier for low power user equipment in accordance with one or more aspects of the present disclosure.

FIG. 9 shows a block diagram 900 of a device 905 that supports a narrowband component carrier for low power user equipment in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of a narrowband component carrier for low power user equipment as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for receiving an indication of a capability for a UE to support narrowband control signaling over a narrowband component carrier that is separate from data channel signaling over one or more wideband component carriers. The communications manager 920 may be configured as or otherwise support a means for transmitting control signaling indicating a configuration for the narrowband component carrier based on the capability. The communications manager 920 may be configured as or otherwise support a means for transmitting the narrowband control signaling on the narrowband component carrier based on the configuration.

By including or configuring the communications manager 920 in accordance with examples as described herein, the device 905 (e.g., a processor controlling or otherwise coupled with the receiver 910, the transmitter 915, the communications manager 920, or a combination thereof) may support techniques which reduce power consumption in systems employing high frequency (e.g., sub-THz) radio frequency spectrum bands by utilizing a narrowband component carrier as a primary component carrier. Smaller resources may be scheduled on the narrowband component carrier, reducing overhead and improving system utilization.

Figure 10:
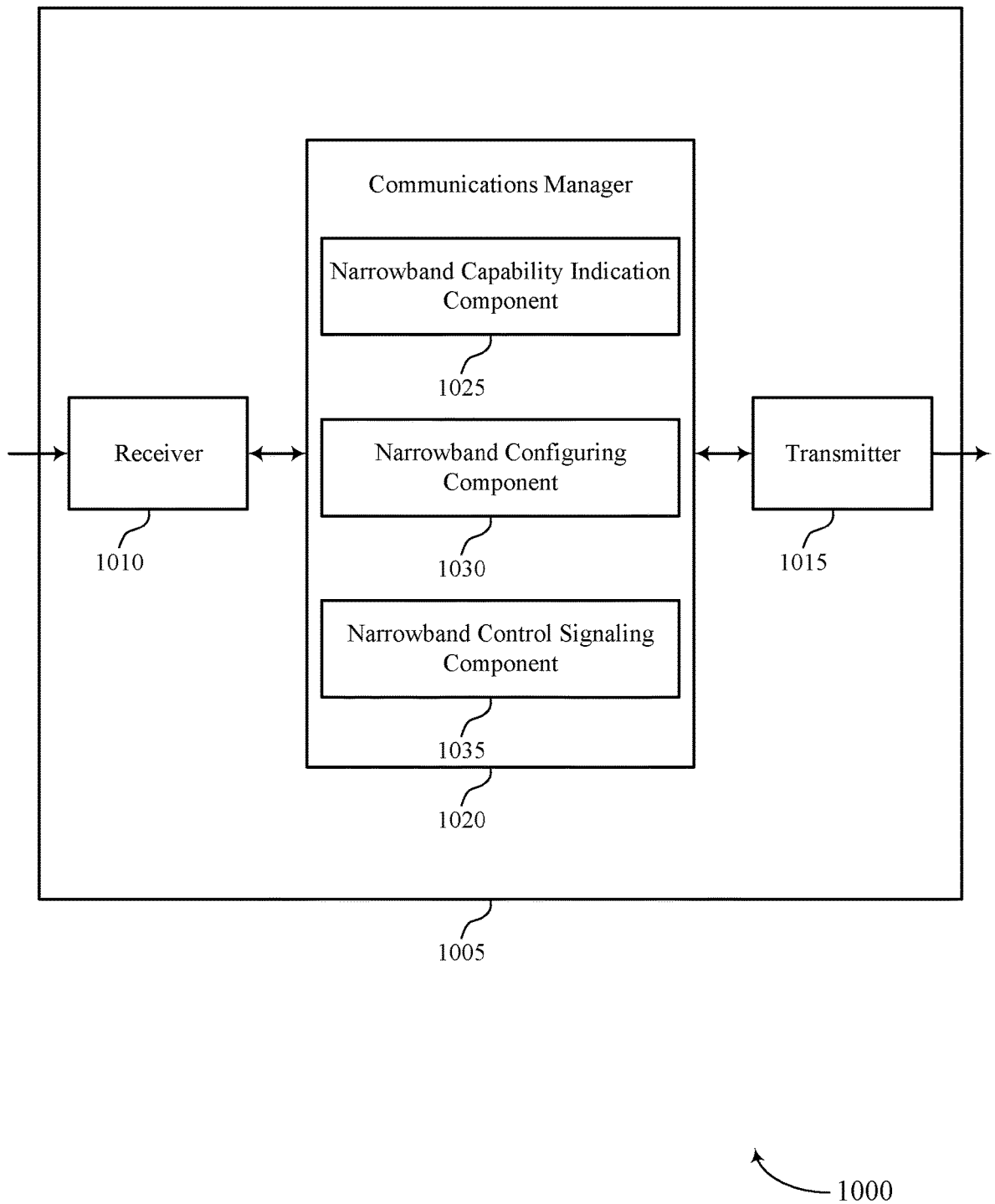

FIG. 10 shows a block diagram 1000 of a device 1005 that supports a narrowband component carrier for low power user equipment in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of a narrowband component carrier for low power user equipment as described herein. For example, the communications manager 1020 may include a narrowband capability indication component 1025, a narrowband configuring component 1030, a narrowband control signaling component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The narrowband capability indication component 1025 may be configured as or otherwise support a means for receiving an indication of a capability for a UE to support narrowband control signaling over a narrowband component carrier that is separate from data channel signaling over one or more wideband component carriers. The narrowband configuring component 1030 may be configured as or otherwise support a means for transmitting control signaling indicating a configuration for the narrowband component carrier based on the capability. The narrowband control signaling component 1035 may be configured as or otherwise support a means for transmitting the narrowband control signaling on the narrowband component carrier based on the configuration.

Figure 11:
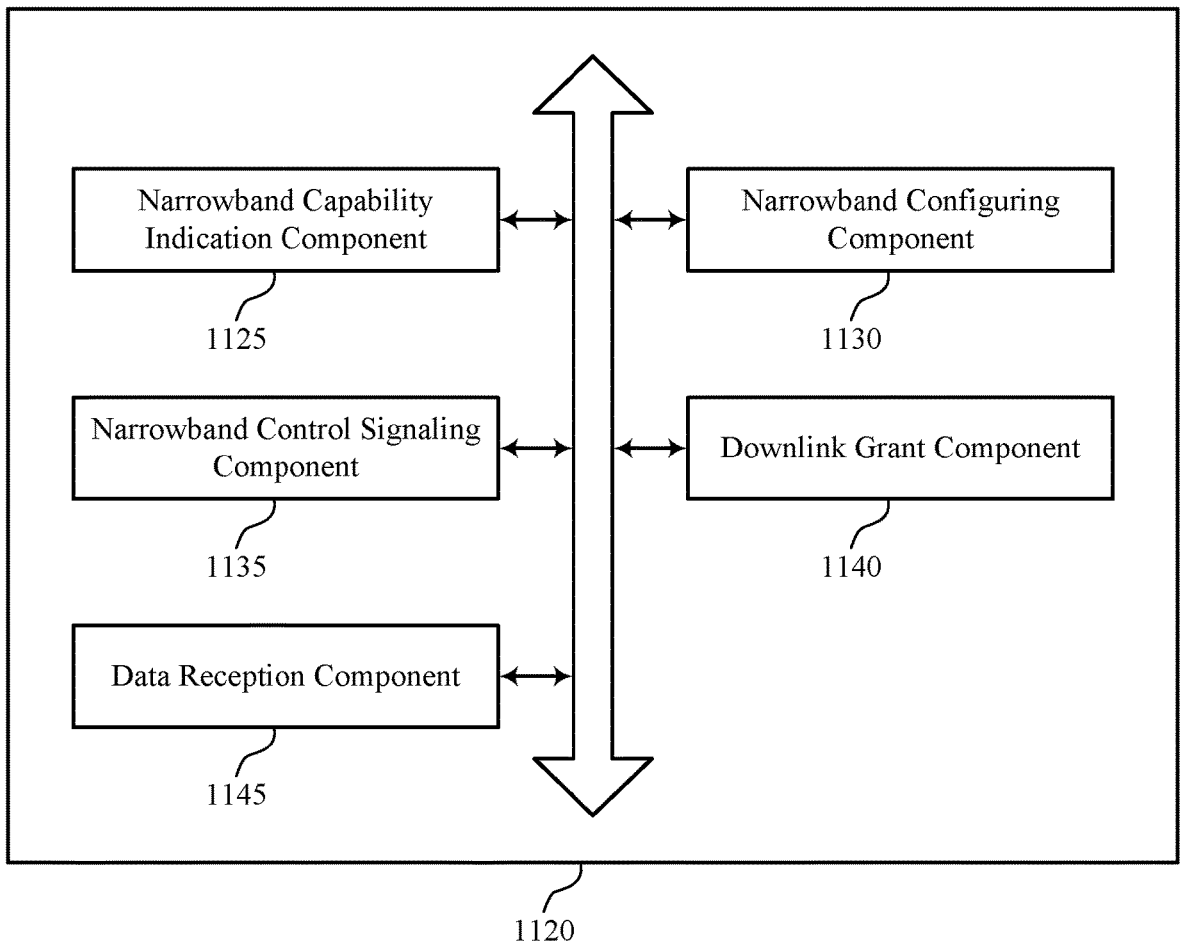
FIG. 11 shows a block diagram of a communications manager that supports a narrowband component carrier for low power user equipment in accordance with one or more aspects of the present disclosure.

FIG. 11 shows a block diagram 1100 of a communications manager 1120 that supports a narrowband component carrier for low power user equipment in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of a narrowband component carrier for low power user equipment as described herein. For example, the communications manager 1120 may include a narrowband capability indication component 1125, a narrowband configuring component 1130, a narrowband control signaling component 1135, a downlink grant component 1140, a data reception component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The narrowband capability indication component 1125 may be configured as or otherwise support a means for receiving an indication of a capability for a UE to support narrowband control signaling over a narrowband component carrier that is separate from data channel signaling over one or more wideband component carriers. The narrowband configuring component 1130 may be configured as or otherwise support a means for transmitting control signaling indicating a configuration for the narrowband component carrier based on the capability. The narrowband control signaling component 1135 may be configured as or otherwise support a means for transmitting the narrowband control signaling on the narrowband component carrier based on the configuration.

In some examples, to support transmitting the narrowband control signaling, the downlink grant component 1140 may be configured as or otherwise support a means for transmitting a downlink grant on the narrowband component carrier, where the downlink grant allocates a downlink shared channel resource on a wideband component carrier of the one or more wideband component carriers. In some examples, to support transmitting the narrowband control signaling, the data reception component 1145 may be configured as or otherwise support a means for transmitting a downlink shared channel transmission on the downlink shared channel resource based on the downlink grant.

In some examples, to support transmitting the narrowband control signaling, the narrowband control signaling component 1135 may be configured as or otherwise support a means for transmitting the narrowband control signaling in a first search space set of the narrowband component carrier that includes more symbols than a second search space set of a wideband component carrier of the one or more wideband component carriers, where the configuration indicates the first search space set.

In some examples, to support transmitting the narrowband control signaling, the narrowband control signaling component 1135 may be configured as or otherwise support a means for transmitting synchronization signal block signaling, initial access signaling, scheduling signaling, reference signal allocation signaling, on the narrowband component carrier.

In some examples, to support receiving the indication of the capability, the narrowband capability indication component 1125 may be configured as or otherwise support a means for receiving an indication of a first error vector magnitude associated with the narrowband component carrier, where the first error vector magnitude associated with the narrowband component carrier is higher than a second error vector magnitude associated with the one or more wideband component carriers.

In some examples, to support transmitting the narrowband control signaling, the narrowband control signaling component 1135 may be configured as or otherwise support a means for transmitting a downlink grant on the narrowband component carrier, where the downlink grant allocates a downlink shared channel resource on the narrowband component carrier. In some examples, to support transmitting the narrowband control signaling, the data reception component 1145 may be configured as or otherwise support a means for transmitting a downlink shared channel transmission on the downlink shared channel resource in accordance with a modulation and coding scheme associated with the narrowband component carrier based on the downlink grant.

In some examples, to support transmitting the control signaling, the narrowband configuring component 1130 may be configured as or otherwise support a means for transmitting the control signaling indicating the configuration that includes an FDRA field that identifies the narrowband component carrier, where the narrowband component carrier is monitored based on the FDRA field.

Figure 12:
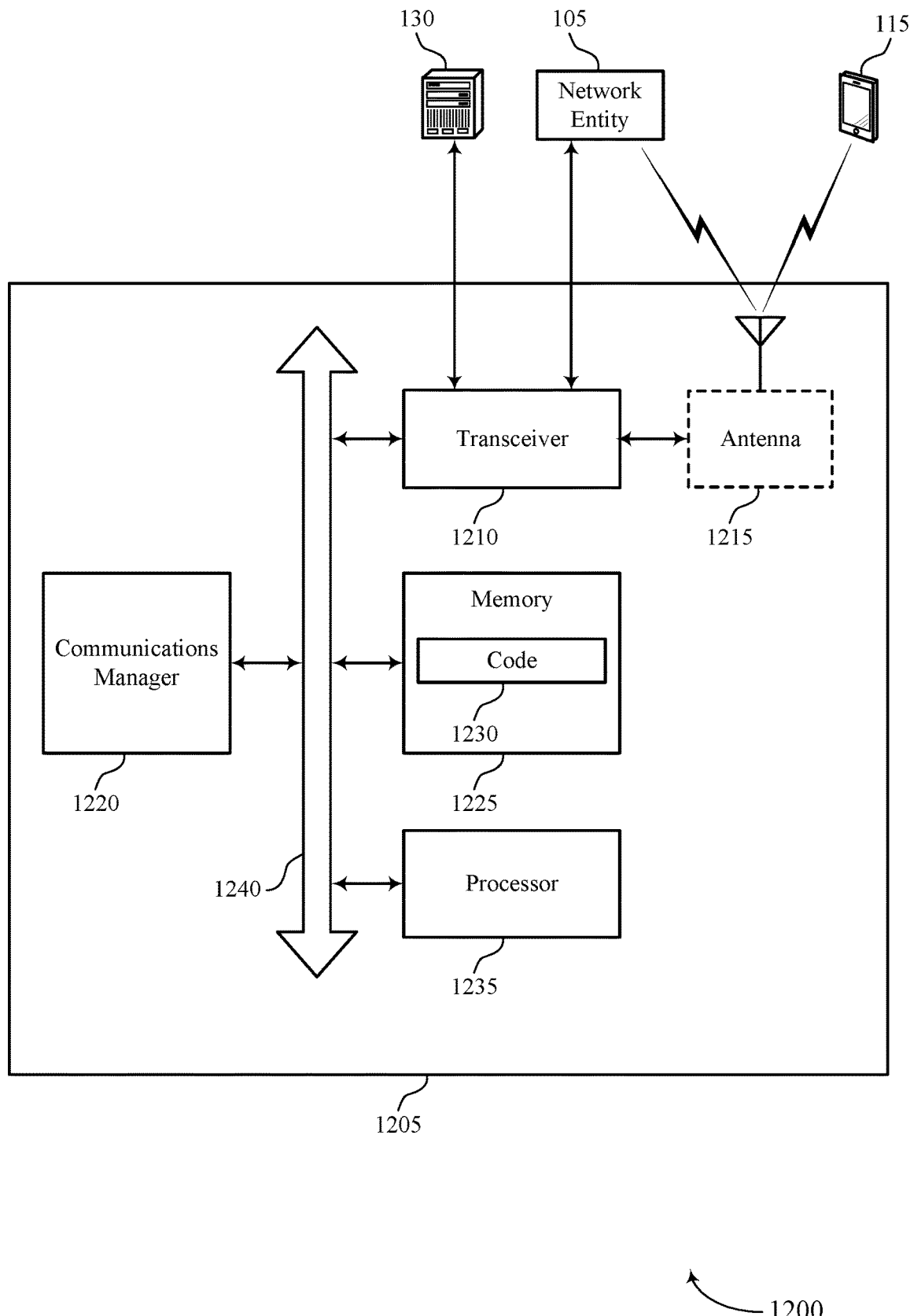
FIG. 12 shows a diagram of a system including a device that supports a narrowband component carrier for low power user equipment in accordance with one or more aspects of the present disclosure.

FIG. 12 shows a diagram of a system 1200 including a device 1205 that supports a narrowband component carrier for low power user equipment in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting a narrowband component carrier for low power user equipment). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for receiving an indication of a capability for a UE to support narrowband control signaling over a narrowband component carrier that is separate from data channel signaling over one or more wideband component carriers. The communications manager 1220 may be configured as or otherwise support a means for transmitting control signaling indicating a configuration for the narrowband component carrier based on the capability. The communications manager 1220 may be configured as or otherwise support a means for transmitting the narrowband control signaling on the narrowband component carrier based on the configuration.

By including or configuring the communications manager 1220 in accordance with examples as described herein, the device 1205 may support techniques for may support techniques which reduce power consumption in systems employing high frequency (e.g., sub-THz) radio frequency spectrum bands by utilizing a narrowband component carrier as a primary component carrier. Smaller resources may be scheduled on the narrowband component carrier, reducing overhead and improving system utilization.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of a narrowband component carrier for low power user equipment as described herein, or the processor 1235 and the memory 1225 may be otherwise configured to perform or support such operations.

Figure 13:
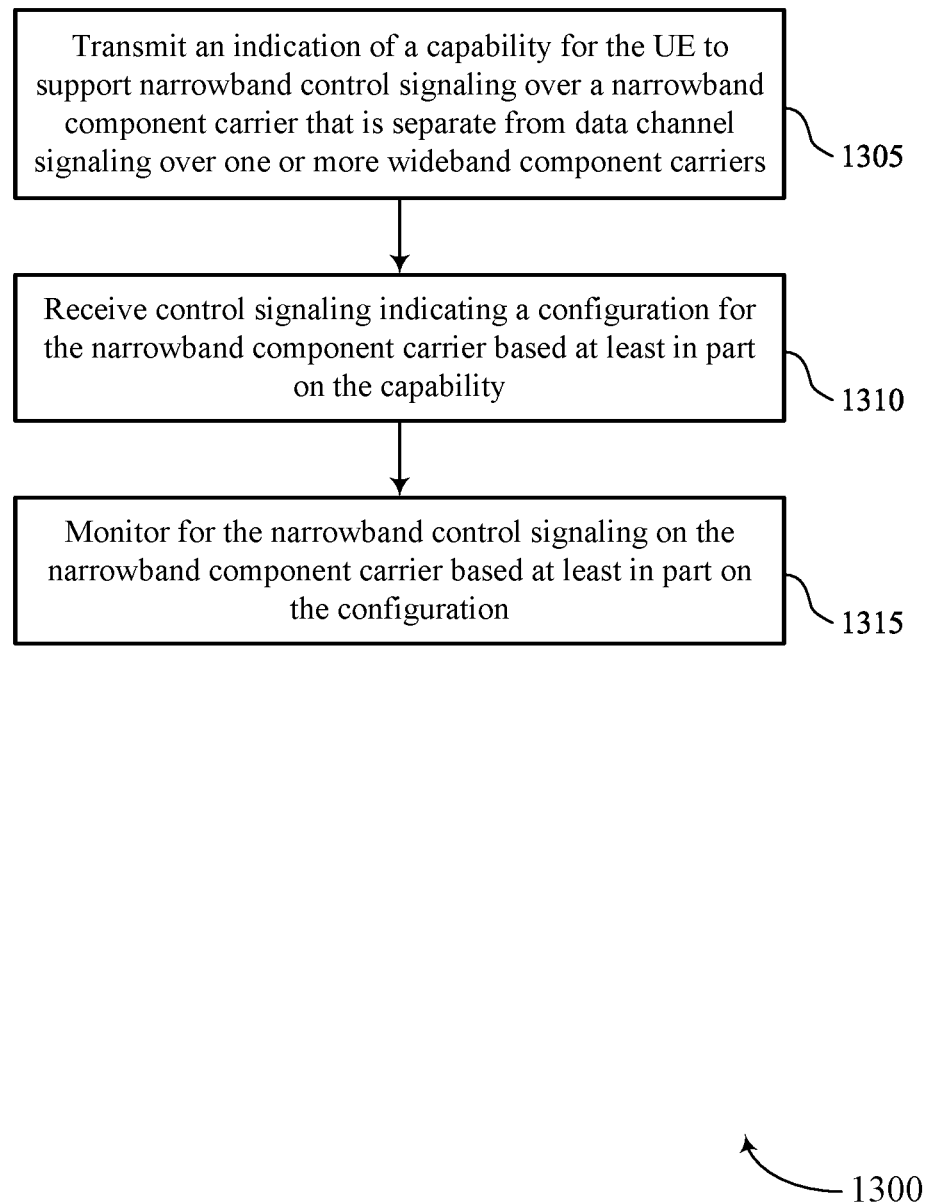
FIGS. 13 through 16 show flowcharts illustrating methods that support a narrowband component carrier for low power user equipment in accordance with one or more aspects of the present disclosure.

FIG. 13 shows a flowchart illustrating a method 1300 that supports a narrowband component carrier for low power user equipment in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting an indication of a capability for the UE to support narrowband control signaling over a narrowband component carrier that is separate from data channel signaling over one or more wideband component carriers. The operations of 1305 may be performed in accordance with examples as disclosed herein. In some examples, aspects of the operations of 1305 may be performed by a narrowband capability indication component 725 as described with reference to FIG. 7.

At 1310, the method may include receiving control signaling indicating a configuration for the narrowband component carrier based on the capability. The operations of 1310 may be performed in accordance with examples as disclosed herein. In some examples, aspects of the operations of 1310 may be performed by a narrowband configuration component 730 as described with reference to FIG. 7.

At 1315, the method may include monitoring for the narrowband control signaling on the narrowband component carrier based on the configuration. The operations of 1315 may be performed in accordance with examples as disclosed herein. In some examples, aspects of the operations of 1315 may be performed by a narrowband monitoring component 735 as described with reference to FIG. 7.

Figure 14:
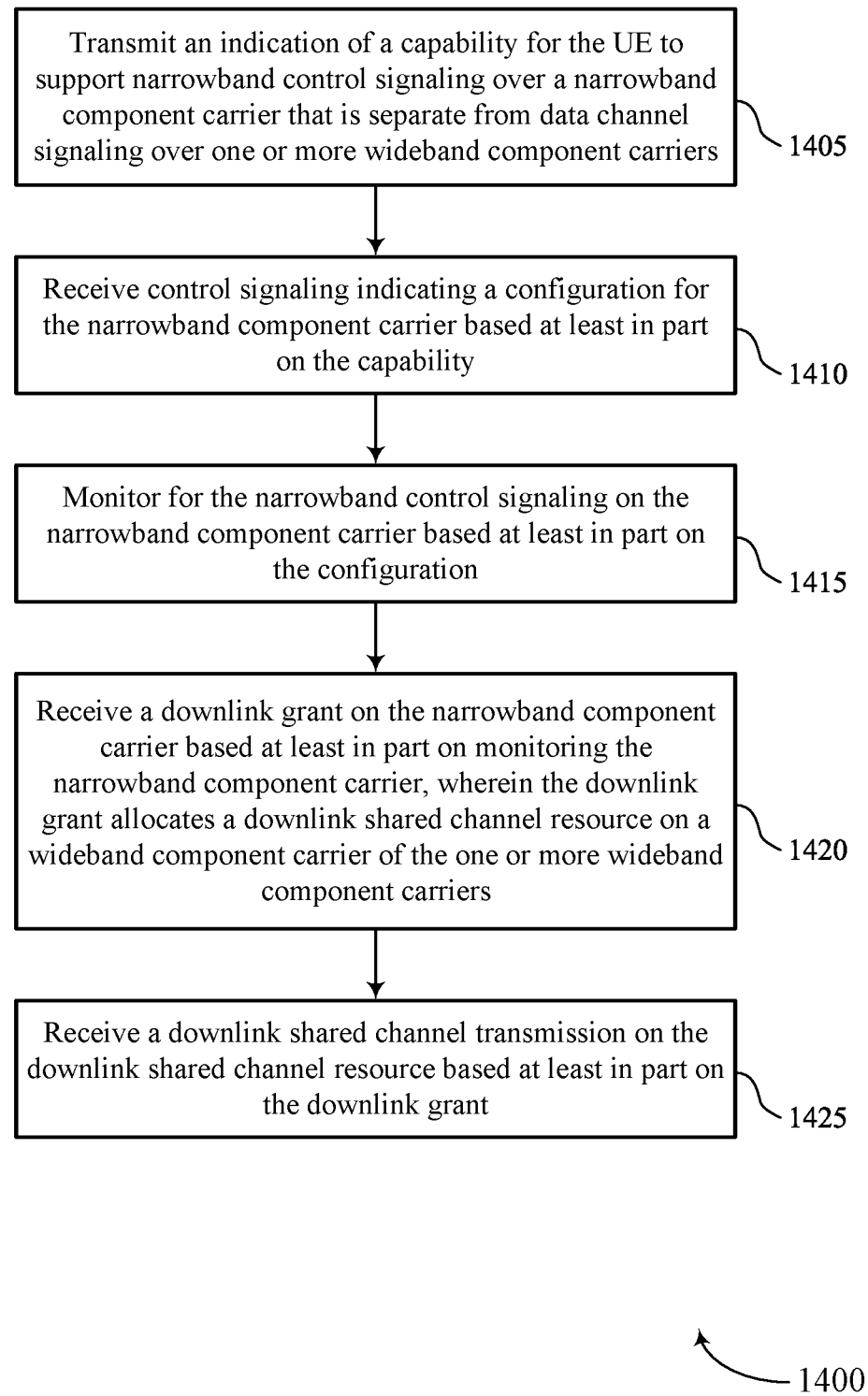

FIG. 14 shows a flowchart illustrating a method 1400 that supports a narrowband component carrier for low power user equipment in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting an indication of a capability for the UE to support narrowband control signaling over a narrowband component carrier that is separate from data channel signaling over one or more wideband component carriers. The operations of 1405 may be performed in accordance with examples as disclosed herein. In some examples, aspects of the operations of 1405 may be performed by a narrowband capability indication component 725 as described with reference to FIG. 7.

At 1410, the method may include receiving control signaling indicating a configuration for the narrowband component carrier based on the capability. The operations of 1410 may be performed in accordance with examples as disclosed herein. In some examples, aspects of the operations of 1410 may be performed by a narrowband configuration component 730 as described with reference to FIG. 7.

At 1415, the method may include monitoring for the narrowband control signaling on the narrowband component carrier based on the configuration. The operations of 1415 may be performed in accordance with examples as disclosed herein. In some examples, aspects of the operations of 1415 may be performed by a narrowband monitoring component 735 as described with reference to FIG. 7.

At 1420, the method may include receiving a downlink grant on the narrowband component carrier based on monitoring the narrowband component carrier, where the downlink grant allocates a downlink shared channel resource on a wideband component carrier of the one or more wideband component carriers. The operations of 1420 may be performed in accordance with examples as disclosed herein. In some examples, aspects of the operations of 1420 may be performed by a downlink grant component 740 as described with reference to FIG. 7.

At 1425, the method may include receiving a downlink shared channel transmission on the downlink shared channel resource based on the downlink grant. The operations of 1425 may be performed in accordance with examples as disclosed herein. In some examples, aspects of the operations of 1425 may be performed by a data reception component 745 as described with reference to FIG. 7.

Figure 15:
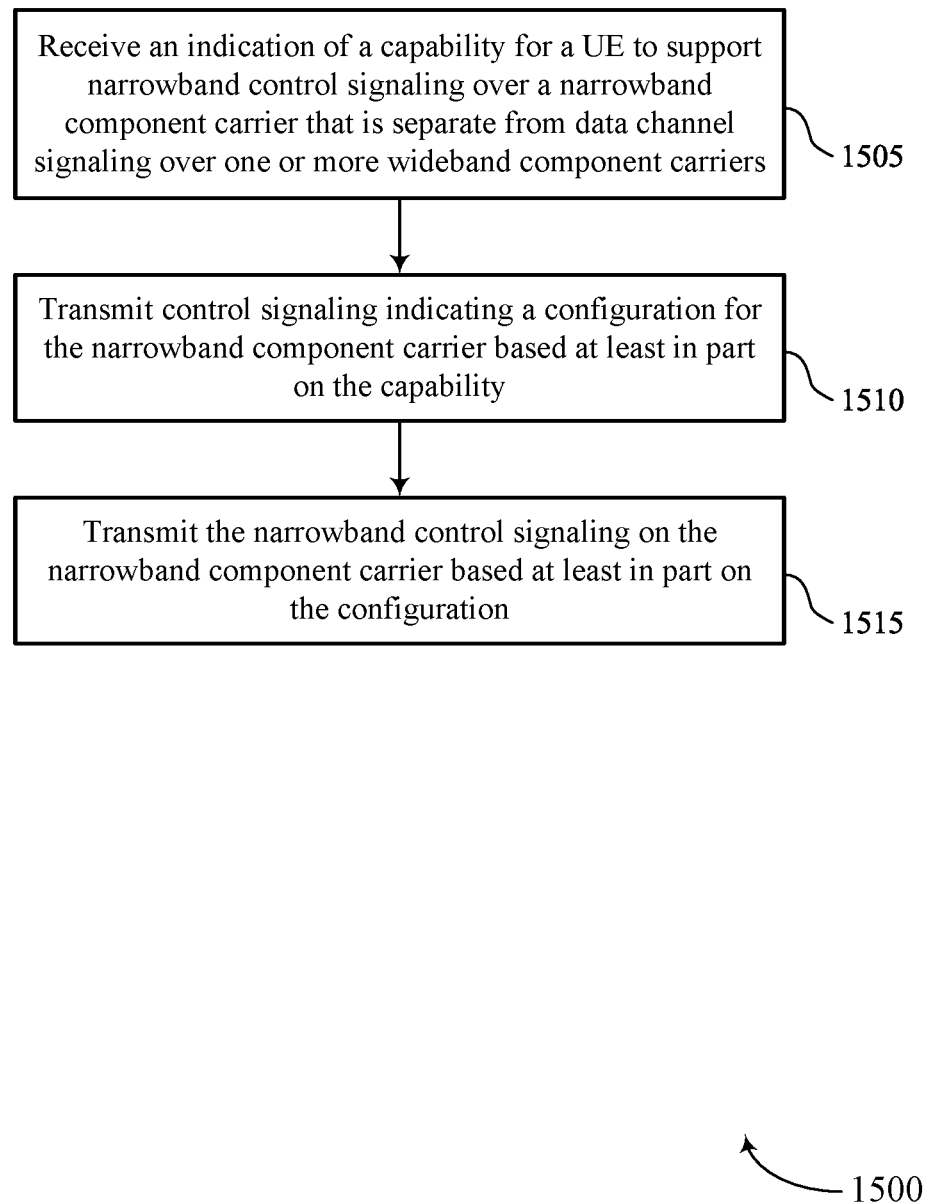

FIG. 15 shows a flowchart illustrating a method 1500 that supports a narrowband component carrier for low power user equipment in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include receiving an indication of a capability for a UE to support narrowband control signaling over a narrowband component carrier that is separate from data channel signaling over one or more wideband component carriers. The operations of 1505 may be performed in accordance with examples as disclosed herein. In some examples, aspects of the operations of 1505 may be performed by a narrowband capability indication component 1125 as described with reference to FIG. 11.

At 1510, the method may include transmitting control signaling indicating a configuration for the narrowband component carrier based on the capability. The operations of 1510 may be performed in accordance with examples as disclosed herein. In some examples, aspects of the operations of 1510 may be performed by a narrowband configuring component 1130 as described with reference to FIG. 11.

At 1515, the method may include transmitting the narrowband control signaling on the narrowband component carrier based on the configuration. The operations of 1515 may be performed in accordance with examples as disclosed herein. In some examples, aspects of the operations of 1515 may be performed by a narrowband control signaling component 1135 as described with reference to FIG. 11.

Figure 16:
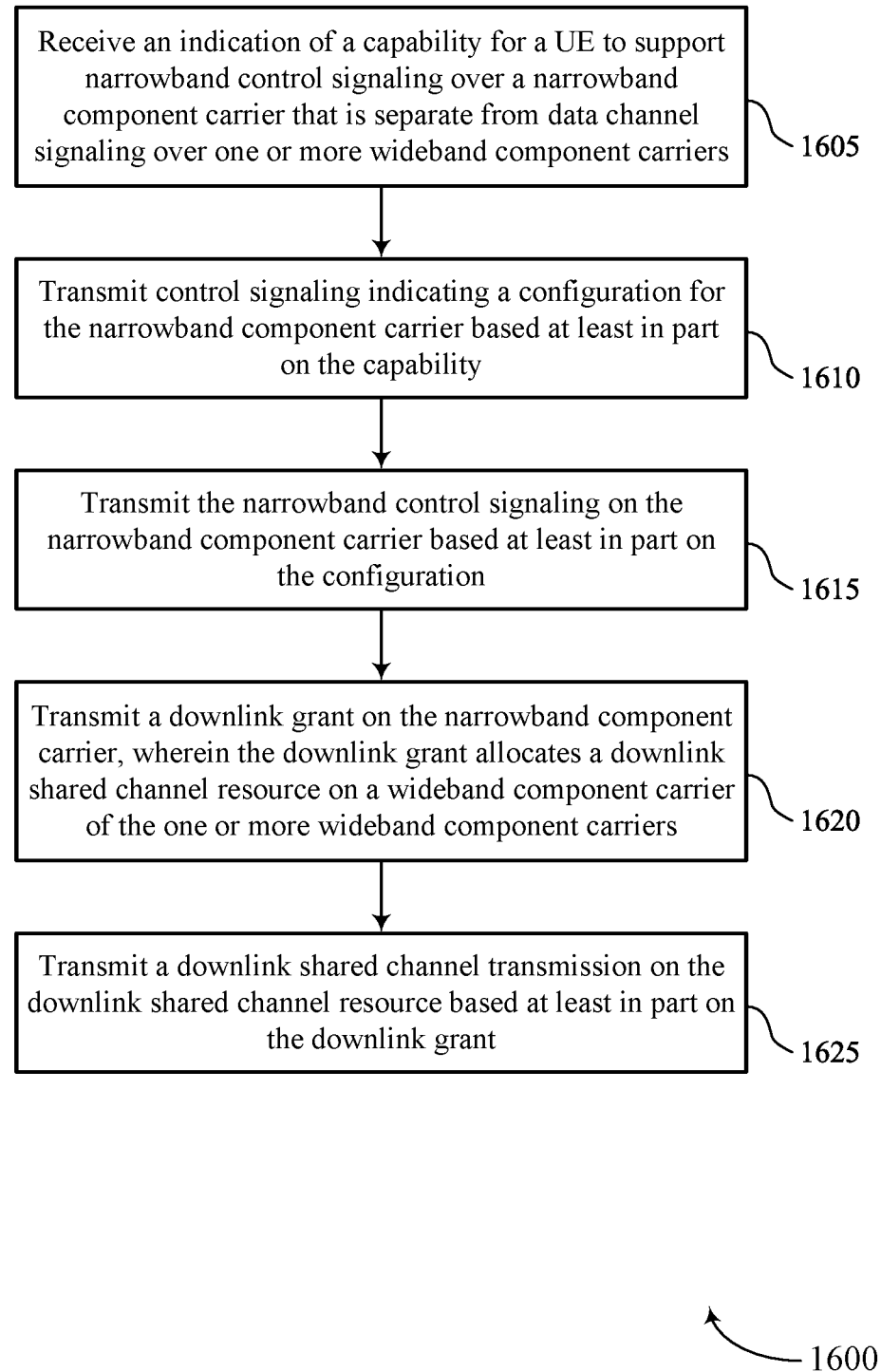

FIG. 16 shows a flowchart illustrating a method 1600 that supports a narrowband component carrier for low power user equipment in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving an indication of a capability for a UE to support narrowband control signaling over a narrowband component carrier that is separate from data channel signaling over one or more wideband component carriers. The operations of 1605 may be performed in accordance with examples as disclosed herein. In some examples, aspects of the operations of 1605 may be performed by a narrowband capability indication component 1125 as described with reference to FIG. 11.

At 1610, the method may include transmitting control signaling indicating a configuration for the narrowband component carrier based on the capability. The operations of 1610 may be performed in accordance with examples as disclosed herein. In some examples, aspects of the operations of 1610 may be performed by a narrowband configuring component 1130 as described with reference to FIG. 11.

At 1615, the method may include transmitting the narrowband control signaling on the narrowband component carrier based on the configuration. The operations of 1615 may be performed in accordance with examples as disclosed herein. In some examples, aspects of the operations of 1615 may be performed by a narrowband control signaling component 1135 as described with reference to FIG. 11.

At 1620, the method may include transmitting a downlink grant on the narrowband component carrier, where the downlink grant allocates a downlink shared channel resource on a wideband component carrier of the one or more wideband component carriers. The operations of 1620 may be performed in accordance with examples as disclosed herein. In some examples, aspects of the operations of 1620 may be performed by a downlink grant component 1140 as described with reference to FIG. 11.

At 1625, the method may include transmitting a downlink shared channel transmission on the downlink shared channel resource based on the downlink grant. The operations of 1625 may be performed in accordance with examples as disclosed herein. In some examples, aspects of the operations of 1625 may be performed by a data reception component 1145 as described with reference to FIG. 11.

The following provides an overview of aspects of the present disclosure:

Aspect 1: A method for wireless communications at a UE, comprising: transmitting an indication of a capability for the UE to support narrowband control signaling over a narrowband component carrier that is separate from data channel signaling over one or more wideband component carriers; receiving control signaling indicating a configuration for the narrowband component carrier based at least in part on the capability; and monitoring for the narrowband control signaling on the narrowband component carrier based at least in part on the configuration.

Aspect 2: The method of aspect 1, further comprising: receiving a downlink grant on the narrowband component carrier based at least in part on monitoring the narrowband component carrier, wherein the downlink grant allocates a downlink shared channel resource on a wideband component carrier of the one or more wideband component carriers; and receiving a downlink shared channel transmission on the downlink shared channel resource based at least in part on the downlink grant.

Aspect 3: The method of aspect 2, further comprising: performing beam management to select a beam of a plurality of available beams during a time gap between receiving the downlink grant on the narrowband component carrier and receiving the downlink shared channel transmission via the downlink shared channel resource of the wideband component carrier, wherein the downlink shared channel transmission is received via the selected beam and wherein the configuration indicates a time duration associated with the time gap.

Aspect 4: The method of any of aspects 2 through 3, further comprising: triggering demodulation of the downlink shared channel transmission via the downlink shared channel resource of the wideband component carrier based at least in part on receiving the downlink grant on the narrowband component carrier.

Aspect 5: The method of any of aspects 1 through 4, wherein monitoring for the narrowband control signaling on the narrowband component carrier further comprises: monitoring for the narrowband control signaling in a first search space set of the narrowband component carrier that includes more symbols than a second search space set of a wideband component carrier of the one or more wideband component carriers, wherein the configuration indicates the first search space set.

Aspect 6: The method of any of aspects 1 through 5, wherein monitoring for the narrowband control signaling comprises: receiving the narrowband control signaling on the narrowband component carrier; and processing the narrowband control signaling using a narrowband receive chain that is separate from a wideband receive chain associated with the one or more wideband component carriers.

Aspect 7: The method of aspect 6, wherein the wideband receive chain associated with the one or more wideband component carriers is inactive while processing the narrowband control signaling using the narrowband receive chain.

Aspect 8: The method of any of aspects 6 through 7, wherein the narrowband receive chain includes an analog front-end, an analog-to-digital converter, a digital front-end, a demodulator, or any combination thereof, unique to the narrowband receive chain.

Aspect 9: The method of any of aspects 1 through 8, wherein monitoring for the narrowband control signaling comprises: receiving synchronization signal block signaling, initial access signaling, scheduling signaling, reference signal allocation signaling, on the narrowband component carrier.

Aspect 10: The method of any of aspects 1 through 9, wherein transmitting the indication of the capability comprises: transmitting an indication of a first error vector magnitude associated with the narrowband component carrier, wherein the first error vector magnitude associated with the narrowband component carrier is higher than a second error vector magnitude associated with the one or more wideband component carriers Aspect 11: The method of any of aspects 1 through 10, further comprising: receiving a downlink grant on the narrowband component carrier based at least in part on monitoring for the narrowband control signaling, wherein the downlink grant allocates a downlink shared channel resource on the narrowband component carrier; and receiving a downlink shared channel transmission on the downlink shared channel resource in accordance with a modulation and coding scheme associated with the narrowband component carrier based at least in part on the downlink grant.

Aspect 12: The method of any of aspects 1 through 11, wherein receiving the control signaling further comprises: receiving the control signaling indicating the configuration that comprises a frequency domain resource allocation (FDRA) field that identifies the narrowband component carrier, wherein the narrowband component carrier is monitored based at least in part on the FDRA field.

Aspect 13: A method for wireless communications at a network entity, comprising: receiving an indication of a capability for a UE to support narrowband control signaling over a narrowband component carrier that is separate from data channel signaling over one or more wideband component carriers; transmitting control signaling indicating a configuration for the narrowband component carrier based at least in part on the capability; and transmitting the narrowband control signaling on the narrowband component carrier based at least in part on the configuration.

Aspect 14: The method of aspect 13, wherein transmitting the narrowband control signaling comprises: transmitting a downlink grant on the narrowband component carrier, wherein the downlink grant allocates a downlink shared channel resource on a wideband component carrier of the one or more wideband component carriers; and transmitting a downlink shared channel transmission on the downlink shared channel resource based at least in part on the downlink grant.

Aspect 15: The method of any of aspects 13 through 14, wherein transmitting the narrowband control signaling comprises: transmitting the narrowband control signaling in a first search space set of the narrowband component carrier that includes more symbols than a second search space set of a wideband component carrier of the one or more wideband component carriers, wherein the configuration indicates the first search space set.

Aspect 16: The method of any of aspects 13 through 15, wherein transmitting the narrowband control signaling comprises: transmitting synchronization signal block signaling, initial access signaling, scheduling signaling, reference signal allocation signaling, on the narrowband component carrier.

Aspect 17: The method of any of aspects 13 through 16, wherein receiving the indication of the capability comprises: receiving an indication of a first error vector magnitude associated with the narrowband component carrier, wherein the first error vector magnitude associated with the narrowband component carrier is higher than a second error vector magnitude associated with the one or more wideband component carriers Aspect 18: The method of any of aspects 13 through 17, wherein transmitting the narrowband control signaling comprises: transmitting a downlink grant on the narrowband component carrier, wherein the downlink grant allocates a downlink shared channel resource on the narrowband component carrier; and transmitting a downlink shared channel transmission on the downlink shared channel resource in accordance with a modulation and coding scheme associated with the narrowband component carrier based at least in part on the downlink grant.

Aspect 19: The method of any of aspects 13 through 18, wherein transmitting the control signaling further comprises: transmitting the control signaling indicating the configuration that comprises a frequency domain resource allocation (FDRA) field that identifies the narrowband component carrier, wherein the narrowband component carrier is monitored based at least in part on the FDRA field.

Aspect 20: An apparatus for wireless communications at a UE, comprising a processor; memory coupled with the processor; and instructions stored in the memory and executable by the processor to cause the apparatus to perform a method of any of aspects 1 through 12.

Aspect 21: An apparatus for wireless communications at a UE, comprising at least one means for performing a method of any of aspects 1 through 12.

Aspect 22: A non-transitory computer-readable medium storing code for wireless communications at a UE, the code comprising instructions executable by a processor to perform a method of any of aspects 1 through 12.

Aspect 23: An apparatus for wireless communications at a network entity, comprising a processor; memory coupled with the processor; and instructions stored in the memory and executable by the processor to cause the apparatus to perform a method of any of aspects 13 through 19.

Aspect 24: An apparatus for wireless communications at a network entity, comprising at least one means for performing a method of any of aspects 13 through 19.

Aspect 25: A non-transitory computer-readable medium storing code for wireless communications at a network entity, the code comprising instructions executable by a processor to perform a method of any of aspects 13 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   memory coupled with the one or more processors; and
   instructions stored in the memory and executable by the one or more processors to cause the UE to:
      transmit an indication of a capability for the UE to support narrowband control signaling over a narrowband primary component carrier of a carrier aggregation that is separate from data channel signaling over one or more wideband secondary component carriers of the carrier aggregation;
      receive control signaling indicating a configuration for the narrowband primary component carrier of the carrier aggregation and the one or more wideband secondary component carriers of the carrier aggregation based at least in part on the capability; and
      monitor for the narrowband control signaling on the narrowband primary component carrier based at least in part on the configuration.

2. The apparatus of claim 1, wherein the instructions are further executable by the one or more processors to cause the UE to:
   receive, based at least in part on monitoring for the narrowband control signaling on the narrowband primary component carrier, a downlink grant on the narrowband primary component carrier, wherein the downlink grant on the narrowband primary component carrier allocates a downlink shared channel resource on a wideband secondary component carrier of the one or more wideband secondary component carriers; and
   receive, based at least in part on the downlink grant on the narrowband primary component carrier, a downlink shared channel transmission on the downlink shared channel resource on the wideband secondary component carrier.

3. The apparatus of claim 2, wherein
   the configuration indicates a duration associated with a time gap between reception of the downlink grant on the narrowband primary component carrier and reception of the downlink shared channel transmission on the downlink shared channel resource on the wideband secondary component carrier.

4. The apparatus of claim 3, wherein the instructions are further executable by the one or more processors to cause the UE to:
   perform beam management to select a beam of a plurality of available beams during the time gap between receiving the downlink grant on the narrowband primary component carrier and receiving the downlink shared channel transmission via the downlink shared channel resource of the wideband secondary component carrier.

5. The apparatus of claim 2, wherein the instructions are further executable by the one or more processors to cause the UE to:
   trigger demodulation, using a wideband receive chain, of the downlink shared channel transmission via the downlink shared channel resource of the wideband secondary component carrier based at least in part on receiving the downlink grant on the narrowband primary component carrier.

6. The apparatus of claim 1, wherein the instructions to monitor for the narrowband control signaling on the narrowband primary component carrier are executable by the one or more processors to cause the UE to:
monitor, based at least in part on the control signaling indicating the configuration for the narrowband primary component carrier, for the narrowband control signaling in a first search space set of the narrowband primary component carrier that includes more symbols than a second search space set of a wideband secondary component carrier of the one or more wideband secondary component carriers, wherein the configuration indicates the first search space set.

7. The apparatus of claim 1, wherein the instructions are further executable by the one or more processors to cause the UE to:
receive, based at least in part on monitoring for the narrowband control signaling on the narrowband primary component carrier, the narrowband control signaling on the narrowband primary component carrier;
process the narrowband control signaling using a narrowband receive chain;
receive the data channel signaling, based at least in part on receiving the narrowband control signaling on the narrowband primary component carrier, on a wideband secondary component carrier of the one or more wideband secondary component carriers; and
process the data channel signaling using a wideband receive chain that is separate from the narrowband receive chain.

8. The apparatus of claim 7, wherein the wideband receive chain associated with the one or more wideband secondary component carriers is inactive while processing the narrowband control signaling using the narrowband receive chain.

9. The apparatus of claim 7, wherein the narrowband receive chain includes an analog front-end, an analog-to-digital converter, a digital front-end, a demodulator, or any combination thereof, unique to the narrowband receive chain.

10. The apparatus of claim 1, wherein the instructions to monitor for the narrowband control signaling are executable by the one or more processors to cause the UE to:
receive synchronization signal block signaling, initial access signaling, scheduling signaling, reference signal allocation signaling, on the narrowband primary component carrier.

11. The apparatus of claim 1, wherein the instructions to transmit the indication of the capability are executable by the one or more processors to cause the UE to:
transmit an indication of a first error vector magnitude associated with the narrowband primary component carrier, wherein the first error vector magnitude associated with the narrowband primary component carrier is higher than a second error vector magnitude associated with the one or more wideband secondary component carriers.

12. The apparatus of claim 1, wherein the instructions are further executable by the one or more processors to cause the UE to:
receive a downlink grant on the narrowband primary component carrier based at least in part on monitoring for the narrowband control signaling, wherein the downlink grant allocates a downlink shared channel resource on the narrowband primary component carrier; and
receive a downlink shared channel transmission on the downlink shared channel resource in accordance with a modulation and coding scheme associated with the narrowband primary component carrier based at least in part on the downlink grant.

13. The apparatus of claim 1, wherein the instructions to receive the control signaling are further executable by the one or more processors to cause the UE to:
receive the control signaling indicating the configuration that comprises a frequency domain resource allocation (FDRA) field that identifies the narrowband primary component carrier, wherein the narrowband primary component carrier is monitored based at least in part on the FDRA field.

14. An apparatus for wireless communications at a network entity, comprising:
one or more processors;
memory coupled with the one or more processors; and
instructions stored in the memory and executable by the one or more processors to cause the network entity to:
receive an indication of a capability for a user equipment (UE) to support narrowband control signaling over a narrowband primary component carrier of a carrier aggregation that is separate from data channel signaling over one or more wideband secondary component carriers of the carrier aggregation;
transmit control signaling indicating a configuration for the narrowband primary component carrier of the carrier aggregation and the one or more wideband secondary component carriers of the carrier aggregation based at least in part on the capability; and
transmit the narrowband control signaling on the narrowband primary component carrier based at least in part on the configuration.

15. The apparatus of claim 14, wherein the instructions are further executable by the one or more processors to cause the network entity to:
transmit, based at least in part on transmitting the narrowband control signaling on the narrowband primary component carrier, a downlink grant on the narrowband primary component carrier, wherein the downlink grant on the narrowband primary component carrier allocates a downlink shared channel resource on a wideband secondary component carrier of the one or more wideband secondary component carriers; and
transmit, based at least in part on the downlink grant on the narrowband primary component carrier, a downlink shared channel transmission on the downlink shared channel resource on the wideband secondary component carrier.

16. The apparatus of claim 14, wherein the instructions to transmit the narrowband control signaling are executable by the one or more processors to cause the network entity to:
transmit, based at least in part on the control signaling indicating the configuration for the narrowband primary component carrier, the narrowband control signaling in a first search space set of the narrowband primary component carrier that includes more symbols than a second search space set of a wideband secondary component carrier of the one or more wideband secondary component carriers, wherein the configuration indicates the first search space set.

17. The apparatus of claim 14, wherein the instructions to transmit the narrowband control signaling are executable by the one or more processors to cause the network entity to:
transmit synchronization signal block signaling, initial access signaling, scheduling signaling, reference signal allocation signaling, on the narrowband primary component carrier.

18. The apparatus of claim 14, wherein the instructions to receive the indication of the capability are executable by the one or more processors to cause the network entity to:
  receive an indication of a first error vector magnitude associated with the narrowband primary component carrier, wherein the first error vector magnitude associated with the narrowband primary component carrier is higher than a second error vector magnitude associated with the one or more wideband secondary component carriers.

19. The apparatus of claim 14, wherein the instructions to transmit the narrowband control signaling are executable by the one or more processors to cause the network entity to:
  transmit a downlink grant on the narrowband primary component carrier, wherein the downlink grant allocates a downlink shared channel resource on the narrowband primary component carrier; and
  transmit a downlink shared channel transmission on the downlink shared channel resource in accordance with a modulation and coding scheme associated with the narrowband primary component carrier based at least in part on the downlink grant.

20. The apparatus of claim 14, wherein the instructions to transmit the control signaling are further executable by the one or more processors to cause the network entity to:
  transmit the control signaling indicating the configuration that comprises a frequency domain resource allocation (FDRA) field that identifies the narrowband primary component carrier, wherein the narrowband primary component carrier is monitored based at least in part on the FDRA field.

21. A method for wireless communications at a user equipment (UE), comprising:
  transmitting an indication of a capability for the UE to support narrowband control signaling over a narrowband primary component carrier of a carrier aggregation that is separate from data channel signaling over one or more wideband secondary component carriers of the carrier aggregation;
  receiving control signaling indicating a configuration for the narrowband primary component carrier of the carrier aggregation and the one or more wideband secondary component carriers of the carrier aggregation based at least in part on the capability; and
  monitoring for the narrowband control signaling on the narrowband primary component carrier based at least in part on the configuration.

22. The method of claim 21, further comprising:
  receiving, based at least in part on monitoring for the narrowband control signaling on the narrowband primary component carrier, a downlink grant on the narrowband primary component carrier, wherein the downlink grant on the narrowband primary component carrier allocates a downlink shared channel resource on a wideband secondary component carrier of the one or more wideband secondary component carriers; and
  receiving, based at least in part on the downlink grant on the narrowband primary component carrier, a downlink shared channel transmission on the downlink shared channel resource on the wideband secondary component carrier.

23. The method of claim 22,
  wherein the configuration indicates a duration associated with a time gap between reception of the downlink grant on the narrowband primary component carrier and reception of the downlink shared channel transmission on the downlink shared channel resource on the wideband secondary component carrier.

24. The method of claim 22, further comprising:
  triggering demodulation, using a wideband receive chain, of the downlink shared channel transmission via the downlink shared channel resource of the wideband secondary component carrier based at least in part on receiving the downlink grant on the narrowband primary component carrier.

25. The method of claim 21, wherein monitoring for the narrowband control signaling on the narrowband primary component carrier further comprises:
  monitoring, based at least in part on the control signaling indicating the configuration for the narrowband primary component carrier, for the narrowband control signaling in a first search space set of the narrowband primary component carrier that includes more symbols than a second search space set of a wideband secondary component carrier of the one or more wideband secondary component carriers, wherein the configuration indicates the first search space set.

26. The method of claim 21, further comprising:
  receiving, based at least in part on monitoring for the narrowband control signaling on the narrowband primary component carrier, the narrowband control signaling on the narrowband primary component carrier;
  processing the narrowband control signaling using a narrowband receive chain;
  receiving the data channel signaling, based at least in part on receiving the narrowband control signaling on the narrowband primary component carrier, on a wideband secondary component carrier of the one or more wideband secondary component carriers; and
  processing the data channel signaling using a wideband receive chain that is separate from the narrowband receive chain.

27. The method of claim 26, wherein the wideband receive chain associated with the one or more wideband secondary component carriers is inactive while processing the narrowband control signaling using the narrowband receive chain.

28. The method of claim 26, wherein the narrowband receive chain includes an analog front-end, an analog-to-digital converter, a digital front-end, a demodulator, or any combination thereof, unique to the narrowband receive chain.

29. The method of claim 21, wherein:
  transmitting the indication of the capability comprises transmitting an indication of a first error vector magnitude associated with the narrowband primary component carrier, wherein the first error vector magnitude associated with the narrowband primary component carrier is higher than a second error vector magnitude associated with the one or more wideband secondary component carriers; and
  monitoring for the narrowband control signaling comprises receiving synchronization signal block signaling, initial access signaling, scheduling signaling, reference signal allocation signaling, on the narrowband primary component carrier.

30. A method for wireless communications at a network entity, comprising:
  receiving an indication of a capability for a user equipment (UE) to support narrowband control signaling over a narrowband primary component carrier of a carrier aggregation that is separate from data channel signaling over one or more wideband secondary component carriers of the carrier aggregation;
transmitting control signaling indicating a configuration for the narrowband primary component carrier of the carrier aggregation and the one or more wideband secondary component carriers of the carrier aggregation based at least in part on the capability; and
transmitting the narrowband control signaling on the narrowband primary component carrier based at least in part on the configuration.

* * * * *